US012782576B2

(12) United States Patent
Tsai et al.

(10) Patent No.: US 12,782,576 B2
(45) Date of Patent: Nov. 3, 2026

(54) MULTIPLEXED LIGHT DETECTION AND RANGING APPARATUS

(71) Applicant: Optowaves, Inc., San Jose, CA (US)

(72) Inventors: Tsung-Han Tsai, Newton, MA (US); Jie Jensen Hou, El Dorato Hills, CA (US); Hao Wu, Wuhan (CN); Shanxing Su, Wuhan (CN); Jiaqi Zhang, Wuhan (CN)

(73) Assignee: Optowaves, Inc., San Jose, CA (US)

( * ) Notice: Subject to any disclaimer, the term of this patent is extended or adjusted under 35 U.S.C. 154(b) by 725 days.

(21) Appl. No.: 18/337,394

(22) Filed: Jun. 19, 2023

(65) Prior Publication Data

US 2024/0103173 A1 Mar. 28, 2024

Related U.S. Application Data

(63) Continuation-in-part of application No. 17/950,178, filed on Sep. 22, 2022, now Pat. No. 11,892,566.

(51) Int. Cl.

| | |
|---|---|
| ***G01S 17/89*** | (2020.01) |
| ***G01S 7/481*** | (2006.01) |
| ***G01S 17/10*** | (2020.01) |
| ***G01S 17/58*** | (2006.01) |

(52) U.S. Cl.

CPC ............ *G01S 17/89* (2013.01); *G01S 7/4813* (2013.01); *G01S 17/10* (2013.01); *G01S 17/58* (2013.01)

(58) Field of Classification Search

None

See application file for complete search history.

(56) References Cited

U.S. PATENT DOCUMENTS

| | | | |
|---|---|---|---|
| 3,901,597 | A | 8/1975 | White |
| 4,174,524 | A | 11/1979 | Moran |
| 5,699,151 | A | 12/1997 | Akasu |
| 5,956,355 | A | 9/1999 | Swanson et al. |
| 6,822,745 | B2 | 11/2004 | De Groot et al. |
| 6,956,653 | B1 | 10/2005 | Lam et al. |
| 7,337,079 | B2 | 2/2008 | Park et al. |
| 8,179,521 | B2 | 5/2012 | Valla et al. |
| 8,558,993 | B2 | 10/2013 | Newbury et al. |
| 8,659,748 | B2 | 2/2014 | Dakin et al. |
| 8,675,184 | B2 | 3/2014 | Schmitt et al. |
| 9,383,447 | B2 | 7/2016 | Schmitt et al. |
| 9,677,870 | B2 | 6/2017 | Jensen |
| 9,702,975 | B2 | 7/2017 | Brinkmeyer et al. |
| 10,234,544 | B2 | 3/2019 | Ando et al. |
| 10,295,673 | B1 | 5/2019 | Tucker |

(Continued)

OTHER PUBLICATIONS

"FMCW-LIDAR with tunable twin-guide laser diode," by A. Dieckmann, Electronics Letters, vol. 30, No. 4, Feb. 17, 1994, 2 pages.

(Continued)

*Primary Examiner* — Luke D Ratcliffe

(74) *Attorney, Agent, or Firm* — Saile Ackerman LLC; Stephen B. Ackerman; Rosemary L.S. Pike

(57) ABSTRACT

A multiplexed line scanning LiDAR system generates a line scan of an object based on the distance of various point measurements to the object. The multiplexed line scanning LiDAR utilizes at least one set of light source emissions to a fiber optic laser element to form a line scan pattern to determine a distance and velocity of an object.

16 Claims, 19 Drawing Sheets

(56) References Cited

U.S. PATENT DOCUMENTS

| | | | |
|---|---|---|---|
| 10,324,170 | B1 * | 6/2019 | Engberg, Jr. .......... G01S 7/4818 |
| 10,324,171 | B2 | 6/2019 | Niclass et al. |
| 10,386,174 | B2 | 8/2019 | Berz |
| 10,416,292 | B2 | 9/2019 | de Mersseman et al. |
| 10,429,495 | B1 | 10/2019 | Wang et al. |
| 10,613,229 | B2 | 4/2020 | Applegate et al. |
| 10,663,587 | B1 | 5/2020 | Sandborn et al. |
| 10,866,319 | B2 | 12/2020 | Brinkmeyer |
| 11,294,040 | B1 | 4/2022 | Tsai et al. |
| 11,520,023 | B2 | 12/2022 | Tsai et al. |
| 2006/0072874 | A1 * | 4/2006 | Johnston ............ G06K 7/10574 385/25 |
| 2017/0097302 | A1 | 4/2017 | Kreitinger |
| 2017/0299721 | A1 | 10/2017 | Eichenholz et al. |
| 2017/0350964 | A1 * | 12/2017 | Kaneda ................ G01S 7/4865 |
| 2018/0128920 | A1 | 5/2018 | Keilaf et al. |
| 2020/0064485 | A1 | 2/2020 | Kotake et al. |
| 2020/0142066 | A1 | 5/2020 | Sandborn et al. |
| 2020/0200874 | A1 | 6/2020 | Donovan |
| 2020/0379094 | A1 | 12/2020 | Hall et al. |
| 2021/0141059 | A1 | 5/2021 | Dussan |
| 2022/0137198 | A1 | 5/2022 | Hamidi et al. |
| 2022/0357437 | A1 | 11/2022 | Tsai et al. |
| 2023/0013992 | A1 | 1/2023 | Schmidtlin |

OTHER PUBLICATIONS

"Generation of RF Intensity-Modulated Laser Pulses by Dual-Frequency Injection Seeding," by Lijun Cheng et al., IEEE Photonics Journal, vol. 10, No. 1, Feb. 2018, 10 pages.
"Sensitivity advantage of swept source and Fourier domain optical coherence tomography," by Michael A. Choma et al., Optics Express 2183, vol. 11, No. 18, Sep. 8, 2003, 7 pages.
"Understanding and Ameliorating Non-Linear Phase and Amplitude Responses in AMCW Lidar," by John P. Godbaz et al., Remote Sensing ISSN 2072-4292, www.mdpi.com/journal/remotesensing, © 2012 by the authors, 22 pages.
"Biaxial Resonant 7mm-MEMS Mirror for Automotive LIDAR application," bu Ulrich Hofmann et al., 2012 International Conference on Optical MEMS and Nanophotonics, Aug. 2012, pp. 150-151.
"Study on the Frequency-Modulated Continuous-Wave LiDAR Mutual Interference," by Il-Pyeong Hwang et al., 2019 IEEE 19th International Conference on Communication Technology, Oct. 16-19, 2019, pp. 1053-1056.
"Indium Phosphide Photonic Integrated Circuit Transceiver for FMCW LiDAR," by Brandon J. Isaac et al., IEEE Journal of Selected Topics in Quantum Electronics, vol. 25, No. 6, Nov./Dec. 2019, 7 pages.
"Polarization-diversity receiver using remotely delivered local oscillator without optical polarization control," by Honglin Ji et al., vol. 28, No. 15, Jul. 20, 2020, Optics Express 22882, 9 pages.
"Versatile endless optical polarization controller/tracker/demultiplexer," by Benjamin Koch et al., Apr. 2014, Optics Express 22(7):8259-76, DOI:10.1364/OE.22.008259, 18 pages.
"Novel Interferometric Method for the Measurement of Laser Wavelength/Frequency-Modulation Sensitivity," by M. Norgia et al., IMTC 2006—Instrumentation and Measurement Technology Conference, Sorrento, Italy, Apr. 24-27, 2006, pp. 444-447.
"A High Resolution, Chirped Pulse Lidar for Simultaneous Range and Velocity Measurements," by Mohammad Umar Piracha et al., CLEO:2011—Laser Applications to Photonic Applications, OSA Technical Digest (CD) (Optical Society of America, 2011), paper CMG1, 2 pages.
"Time-frequency analysis of long fiber Bragg gratings with low reflectivity," by Juan Sancho et al., Optics Express vol. 21, Issue 6, pp. 7171-7179, Mar. 25, 2013.
"Application of Time-Frequency Domain Reflectometry for Detection and Localization of a Fault on a Coaxial Cable," by Yong-June Shin et al., IEEE Transactions on Instrumentation and Measurement, vol. 54, No. 6, Dec. 2005, pp. 2493-2500.
"Realization of Multitone Continuous Wave Lidar," by Rasul Torun et al., IEEE Photonics Journal, vol. 11, No. 4, Aug. 2019, 11 pages.
"MEMS Laser Scanners: A Review," by Sven T. S. Holmstrom et al., Journal of Microelectromechanical Systems vol. 23, No. 2, Apr. 2014, pp. 259-275.
"MEMS Mirrors for LiDAR: A Review," by Dingkang Wang et al., Micromachines, MDPI, Apr. 27, 2020; 11(5):456. doi: 10.3390/mi11050456, 24 pages.
"Comb-calibrated Frequency-modulated Continuous-wave Lidar," by Yang Xie et al., 2020 IEEE 7th International Workshop on Metrology for AeroSpace (MetroAeroSpace), Jun. 22-24, 2020, pp. 372-376.
"A Phase-Retrieving Coherent Receiver Based on Two-Dimensional Photodetector Array," by Yuki Yoshida et al., Journal of Lightwave Technology, vol. 38, No. 1, Jan. 1, 2020, pp. 90-100.
PCT International Search Report, International Application No. PCT/US 24/34250, Applicant: Optowaves, Inc., Mail date: Sep. 11, 2024, 2 pages.
PCT Written Opinion, International Application No. PCT/US 24/34250, Applicant: Optowaves, Inc., Mail date: Sep. 11, 2024, 10 pages.
International Search Report, International Application No. PCT/US 23/73822, Applicant: Optowaves, Inc. Mail date: Feb. 15, 2024, 4 pages.
PCT Written Opinion, International Application No. PCT/US 23/73822, Applicant: Optowaves, Inc. Mail date: Feb. 15, 2024, 9 pages.
US Office Action, U.S. Appl. No. 17/708,728, Applicant: Tsai et al., Mail date: Jun. 1, 2022, 13 pages.
US Office Action, U.S. Appl. No. 17/315,678, Applicant: Tsai et al., Mail date: Jul. 15, 2021, 22 pages.
US Notice of Allowance, U.S. Appl. No. 17/315,678, Applicant: Tsai et al., Mail date: Nov. 26, 2021, 7 pages.
US Notice of Allowance, U.S. Appl. No. 17/708,728, Applicant: Tsai et al., Mail date: Sep. 28, 2022, 17 pages.
"Range-Resolved Optical Interferometric Signal Processing," by Thomas Kissinger, Cranfield University, Jun. 2015, Phd Thesis, Center for Engineering Photonics, School of Aerospace, Transport and Manufacturing, 239 pages.
"Multipoint Gas Detection Using Range Resolved Interferometry," by James Bremner, Cranfield University, Jul. 2021, Phd Thesis, Center for Engineering Photonics, School of Aerospace, Transport and Manufacturing, 201 pages.
"Simultaneous Dual-Band Wavelength-Swept Fiber Laser Based on Active Mode Locking," by Hwi Don Lee et al., IEEE Photonics Technology Leters, vol. 26, No. 2, Jan. 15, 2014, 5 pages.
"Stable Multi-Wavelength Thulium-Doped Fiber Laser With Two Cascaded Single-Mode-Four-Mode-Single-Mode Fiber Interferometers," by Ying Guo et al., IEEE Access, Multidiciplinary, Rapid Review, Open Access Journal, vol. 9, Jan. 5, 2021, pp. 1197-1204.
"A Survey on LiDAR Scanning Mechanisms," by Thinal Raj et al., Electronics 2020, 9(5), 741; https://doi.org/10.3390/electronics9050741, Apr. 30, 2020, 25 pages.
"Time-Stretched Femtosecond Lidar Using Microwave Photonic Signal Processing," by Lijie Zhao et al., Journal of Lightwave Technology, vol. 38, No. 22, Nov. 15, 2020, pp. 6265-6271.
"Coherent Detection of Backscattered Polarized Laser With Polarization Diversity Reception," by Yihua Hu et al., 2016 Fourth International Conference on Ubiquitous Position, Indoor Navigation and Location Based Services (UPINLBS), Nov. 2-4, 2016, pp. 271-277.
Co-pending U.S. Appl. No. 17/950,178, filed Sep. 22, 2022, by Tung-Han Tsai et al., "Multiplexed Light Detection and Ranging Apparatus," 37 pages.
Office Action, U.S. Appl. No. 17/950,178, Applicant: Tsai et al., Mail date: May 10, 2023, 25 pages.

* cited by examiner

MULTIPLEXED LIGHT DETECTION AND RANGING APPARATUS

This disclosure is related to U.S. Pat. No. 11,294,040, issued Apr. 5, 2022, and to U.S. patent application Ser. No. 17/708,728, both hereby incorporated by reference in their entirety and assigned to a common assignee.

This application is a Continuation-in-Part of U.S. patent application Ser. No. 17/950,178, filed on Sep. 22, 2022, which is hereby incorporated by reference in its entirety and assigned to a common assignee.

TECHNICAL FIELD

This disclosure generally relates to light detection and ranging systems. More particularly, this disclosure relates to light detection and ranging systems that generate multiple laser beams from a single source and provides a hybrid scanner to scan the multiple laser beams to a target or targets and receives back-reflected laser beams to multiplexed interferometry circuits to measure distance and speed. Even more particularly, this disclosure relates to methods for light detection and ranging, including methods for multiplexing interferometry techniques to measure distance and speed. And still more particularly, this disclosure relates to light detection and ranging circuits and systems that provide multiplexed line scanning circuits and systems.

BACKGROUND

Light detection and ranging (LiDAR) is analogous to radio detection and ranging (RADAR) in that LiDAR uses optical waves to determine objects" range, angle, and velocity. LiDAR utilizes differences in laser light return times and wavelengths that can be used to make digital 3-D representations of the target and has been broadly used in terrestrial, airborne, and mobile applications. A LiDAR instrument consists of one or more laser emitters, optics, a scanner, a photodetector, and a signal processor. One or more laser emitters generate a coherent light beam transferred through a set of optics to a scanner to be transmitted to an object to determine the distance or the object's velocity. The physical features are determined in the case of three-dimensional (3D) scanning. The photodetector receives the coherent light reflected from the object and converts the coherent light to electrical signals that are processed to determine the object's distance. The emitter will generate the coherent light as pulses. The signal processor records the time of the transmitted pulse, and the time of the reception of the reflection of the coherent light is recorded. The distance is the difference between the transmitted time and the received time divided by two and multiplied by the speed of light.

Amplitude modulation continuous wave (AMCW) LiDAR is a phase-based form of LiDAR. Unlike direct pulse detection, the phase-based LiDAR emits a continuous laser signal. It modulates the laser emission amplitude with a high-speed radio frequency (RF) signal to encode the output optical signal. The phase difference between the emitted and reflected signals is detected for ranging. The phase shift of a sinusoidally-modulated continuous laser waveform can be used to infer the distance to an object.

Frequency-modulated continuous wave (FMCW) LiDAR is similar to AMCW LiDAR, but the modulation and demodulation are performed optically rather than electrically. FMCW LiDAR uses a wavelength-tuning light source or a phase-modulating light source and an interferometer to measure the object's distance with good sensitivity. The FMCW laser's frequency is linearly modulated by a carrier signal to measure the laser round-trip flight time accurately. The flight time can be calculated with high precision by detecting the beat frequency signal between the returned laser light beam and the emitted laser light beam. High-precision distance measurement can be achieved.

Time-of-interference (TOI) LiDAR technology is a new ranging method that overcomes limitations of traditional LiDAR techniques, including time-of-flight (ToF) and frequency-modulated continuous-wave (FWCW) with the following features: (1) utilization of an interferometer with a balanced detector allowing highly sensitive detection of weak interference signals from long range; (2) time delay of the interference signal can be measured even when the signal frequency is high, and thus provides accurate measurement of the distance from the object, eliminating the need of high-speed data acquisition systems; (3) phase- or wavelength-modulation requirement of the light source is low and thus can simplify the complexity of the driver circuit design for the light source. The operating speed of TOI LiDAR systems are mainly limited by the light source's modulation speed and the optical receiver's efficiency. The high sensitivity detection of the TOI LiDAR system reduces the output power requirement of the light source. Thus, it makes the system architecture design highly flexible and allows it to drive multiple TOI LiDAR systems perform speed measurements simultaneously using a single light source.

SUMMARY

An object of this disclosure is to provide a multiplexed light detection and ranging (LiDAR) system that is based on time-of-interference (TOI), time-frequency domain reflectometry, and a small wavelength modulation of the coherent light source. The multiplexed LiDAR system records the time delay of two or more interference signals or time-of-interference (TOI) using one single coherent light source in which the operating current or operating temperature determines the output wavelength.

To accomplish this object, a multiplexed LiDAR system has a coherent light source connected to a modulation/scan controller. The modulation scan controller is configured to generate a pulsed wavelength control signal transferred to the coherent light source. The pulsed wavelength control signal may be a current modulation signal or a laser ambient temperature adjustment signal. The pulsed wavelength control signal modulates the coherent light source to generate a pulsed wavelength-modulated coherent light emission.

The pulsed wavelength-modulated coherent light emission is coupled into at least two interferometers. Each interferometer is configured to partition the pulsed wavelength-modulated coherent light emission into sampling and reference portions. The pulsed wavelength-modulated coherent light emissions sampling portion is arranged to impinge upon an object to be measured. The reference portion of the pulsed wavelength-modulated coherent light emission is arranged to provide a reference basis for determining the distance from the multiplexed LiDAR system to the object. The interferometers are further configured for transferring the pulsed wavelength-modulated coherent light to a hybrid scanner. The hybrid scanner is configured to physically transfer the pulsed wavelength-modulated coherent light's sampling portion from each interferometer to a different location on the object and scan the object's surface with the pulsed wavelength-modulated coherent light from each interferometer at the same time. The hybrid scanner is further configured to receive a portion of the pulsed wavelength-modulated coherent light back-reflected from the different locations on the object. The back-reflected pulsed wavelength-modulated coherent light is transferred from the hybrid scanner to each interferometer and then coupled with the reference portion of the pulsed wavelength-modulated coherent light in each interferometer to form an optical interference light signal.

The hybrid scanner is configured to provide a scanning pattern for the pulsed wavelength-modulated coherent light from each interferometer. The scanning patterns are configured to cover different areas on the object to increase the effective scanning range of the multiplexed LiDAR system. In various embodiments, the scanning patterns are configured to cover the same area on the object to increase the effective scanning pixel density of the multiplexed LiDAR system. The hybrid scanning mirror has at least one planar mirror rotating in a first axis and a faceted mirror structured for reflecting the multiple pulsed wavelength-modulated coherent light's sampling portions from the multiple interferometers to the objects. The faceted mirror is rotated on a second axis to establish the scanning patterns for the multiple pulsed wavelength-modulated coherent light's sampling portions.

In various embodiments, the scanning patterns of the hybrid scanner are configured to provide a 1-dimensional scan (also known as line-scan) for the multiple pulsed wavelength-modulated coherent light's sampling portions to effectively increase the frame rate.

The multiplexed LiDAR system has a photodetector array configured to convert the optical interference signal from each interferometer to an electrical interference signal. In various embodiments, the photodetector is configured as a polarization-diversity balanced amplified detector. The photodetector has at least one power monitor to measure the input power level to the photodetector. The power monitor output provides a modulated power level with a time delay associated with the object's distance.

The multiplexed LiDAR system has a signal processor configured to receive the electrical interference signal and convert the electrical interference signal to digital data representing the electrical interference signal amplitude as the digital data. The signal processor is configured to generate an imaging range based on the distance from the object to be displayed. The imaging range to be displayed is calculated by a computer system programmed to calculate the time delay determined by the optical interference signal from all interferometers.

The modulation/scan controller is configured to generate a wavelength modulation control signal with a low-duty cycle to modulate the coherent light source by controlling the narrow coherent light source's driving current, the temperature of the narrow bandwidth light source, or adjusting the phase of the light emitted from the light source. In other embodiments, the modulation/scan controller will generate a pulsed phase control signal for generating interference when there is a time delay between light in the sample and the reference arms of the interferometer.

In various embodiments, the interferometer includes a polarization controller used to adjust the polarization states of the coherent light emission from the light source and maximize the amplitude of the optical interference signal or electrical interference signal. The interferometer has a first coupler that receives the pulsed wavelength-modulated coherent light from the polarization controller. The coupler divides the pulsed wavelength-modulated coherent light. A first portion of the pulsed wavelength-modulated coherent light is fed into at least one sample arm. A second portion of the pulsed wavelength-modulated coherent light is fed to a reference arm. The interferometer has a circulator connected to receive the first portion of the pulsed wavelength-modulated coherent light from at least one sample arm. The circulator is configured such that the pulsed wavelength-modulated coherent light from the sample arm enters the circulator and exits from the next port. Generally, the next port is in a clockwise direction to direct the pulsed wavelength-modulated coherent light to the scanner. The scanner is configured to physically transfer the sample pulsed wavelength-modulated coherent light to scan the objects. The sampled pulsed wavelength-modulated coherent light is back-reflected from the object for making ranging measurements to the scanner and transferred to the circulator within the interferometer. The back-reflected pulsed wavelength-modulated coherent light is then transmitted from the circulator to a second coupler.

The interferometer's reference arm has a length greater than the sampling arm's length by more than two times the system's maximum ranging depth. The second portion of the pulsed wavelength-modulated coherent light in the reference arm is applied to the second coupler. The second portion of the pulsed wavelength-modulated coherent light transported in the reference arm is coupled with the collected back-reflected pulsed wavelength-modulated light to form an optical interference light signal. The optical interference light signal exits the second coupler to enter a photodetector array.

The maximum frequency of the optical interference signal corresponds to the minimum ranging depth of the multiplexed LiDAR system. It is greater than a Nyquist sampling frequency of the digitizer in the data acquisition and signal processor. The minimum frequency of the optical interference signal corresponds to the maximum ranging depth of the multiplexed LiDAR system. The time delay of the detected optical interference is measured at the falling edge of the optical interference signal's envelope.

In various embodiments, each interferometer's sampled pulsed wavelength-modulated coherent light beam is transferred to one individual scanner or one individual fiberoptic element, including an engineered lens and or collimator aiming at different directions so the multiplexed LiDAR system can be configured to measure distance and display imaging ranges from multiple objects in different directions simultaneously.

In various embodiments, the multiplexed LiDAR system can utilize two or more time-of-flight (ToF) or FMCW ranging methods with a single hybrid canner configured to provide a scanning pattern for each ToF or FMCW subsystem. The scanning patterns are configured to cover different areas on the object to increase the effective scanning range of the multiplexed LiDAR system or cover the same area on the object to increase the effective scanning pixel density of the multiplexed LiDAR system.

DETAILED DESCRIPTION

A Multiplexed LiDAR System is configured to generate an image of an object based on the distance of various point measurements to the object. The Multiplexed LiDAR System utilizes light emitted from a pulsed wavelength-modulated light source divided into at least two sets of light emissions to a scanner to simultaneously form multiple scanning patterns that effectively increase the scanning speed, scanning area, or image pixel density of the LiDAR system.

Figure 1A:
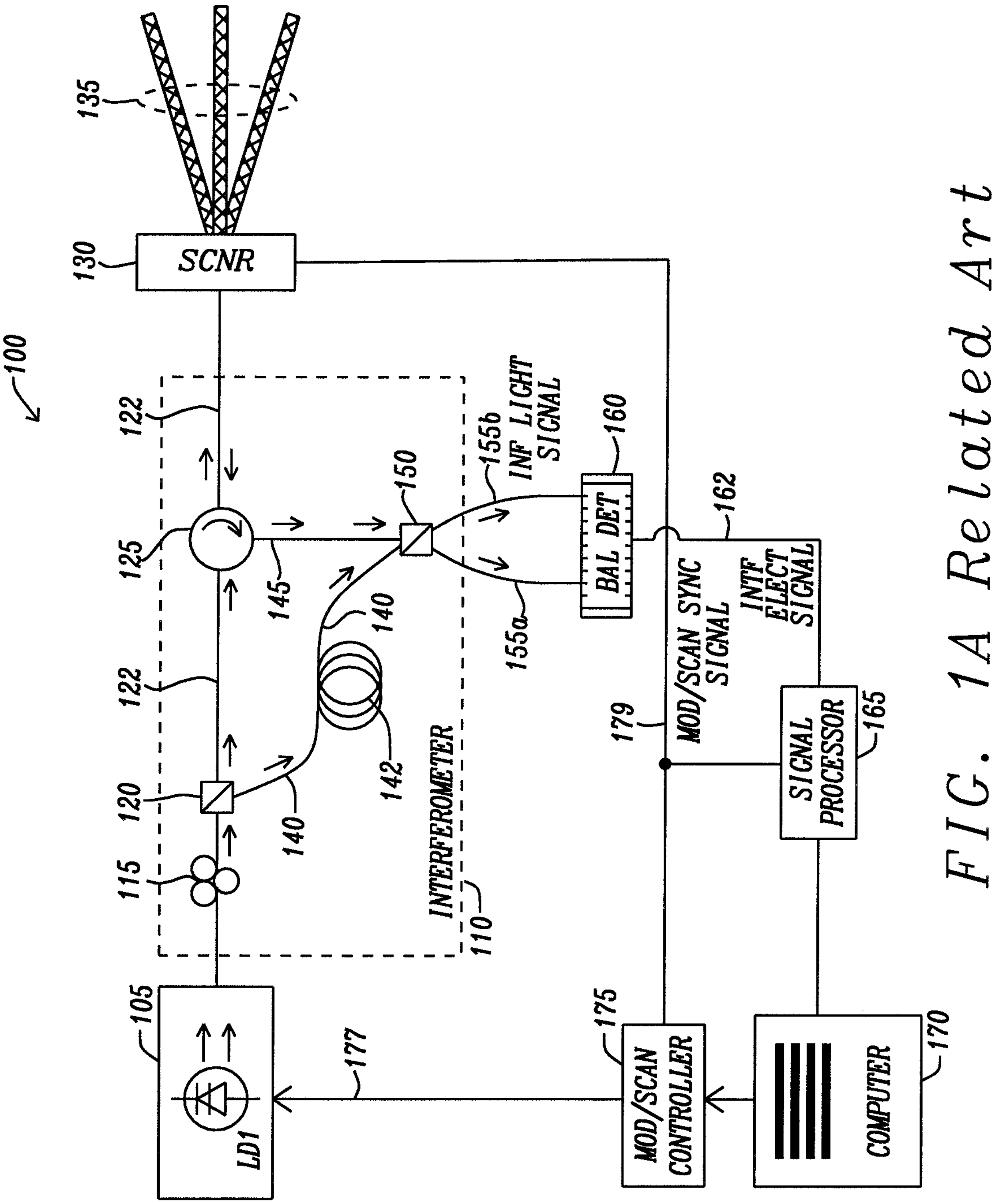
FIG. 1A Related Art
FIG. 1A is a schematic drawing of a TOI LiDAR System of the related art.

FIG. 1A is a schematic drawing of a TOI System 100 of the related art. In FIG. 1A, a TOI LiDAR system 100 includes a pulsed wavelength-modulated narrow bandwidth light source 105. The pulsed wavelength-modulated light source 105 emits a pulse-modulated coherent light having an output spectrum composed of single or multiple longitudinal modes. A longitudinal mode of a resonant cavity is a particular standing wave pattern formed by waves confined in the cavity. In a laser, the light is amplified in a cavity resonator, usually composed of two or more mirrors. The cavity has mirrored walls that reflect the light to allow standing wave modes to exist in the cavity with little loss. The longitudinal modes correspond to the reflecting wave's wavelengths reinforced by constructive interference after many reflections from the cavity of an object's reflecting surfaces. All other wavelengths are suppressed by destructive interference. A longitudinal mode pattern has its nodes located axially along the length of the cavity. The laser of the pulsed wavelength-modulated light source 105 is implemented as one of four types of lasers known in the art and categorized as a solid-state laser, a gas laser, a liquid laser, or a semiconductor laser. In the discussion of the structure of this disclosure, the pulsed wavelength-modulated light source 105 is shown as a semiconductor laser with a wavelength or frequency controlled by either current or temperature. The modulation of the pulsed wavelength-modulated light source 105 is discussed hereinafter.

The pulsed wavelength-modulated narrow band light source 105 emits the pulsed wavelength-modulated coherent light to an interferometer 110. The pulsed wavelength-modulated narrow bandwidth light source 105 emissions are through free space, an optical fiber, or an optical waveguide to the interferometer 110

The interferometer 110, in various embodiments, is implemented as fiber optics, bulk optics, integrated photonic circuitry, or some combinations thereof. The interferometer 110 has a polarization controller 115 that receives the pulsed wavelength-modulated coherent light and adjusts the polarization states of the pulsed wavelength-modulated coherent light from the light source 105. It maximizes the amplitude of the optical interference signals transferred in the optical paths **155*a* and 155*b* or interference electrical signal 162. The pulsed wavelength-modulated coherent light from the light source 105 or the pulsed wavelength-modulated coherent light transferred through the polarization controller 115 is applied to a coupler 120. The coupler 120 divides the coherent light into a sample portion fed into at least one sample arm 122 and a reference portion of the pulsed wavelength-modulated coherent light fed into a reference arm 140 within the interferometer 110. The sample arm 122 and the reference arm 140** are implemented as a free-space path, an optical fiber, or an optical waveguide.

The interferometer has a circulator 125 that receives the sample portion of the pulsed wavelength-modulated coherent light from the sample arm 122. The circulator 125 is configured such that the sample portion of the pulsed wavelength-modulated coherent light enters the circulator 125 and exits from the next port to a section of the sample arm 122. The next port is generally, but not required, in a clockwise direction to direct the coherent light through the sample arm 122 to a scanner 130. The scanner 130 is configured to physically transfer the sample pulsed wavelength-modulated coherent light 135 to scan the object. The sampled pulsed wavelength-modulated coherent light 135 is back-reflected from the object for making the ranging measurements. The back-reflected pulsed wavelength-modulated coherent light is received by the scanner 130 and transferred to the circulator 125. The back-reflected pulsed wavelength-modulated coherent light through the optical path 145 is then transferred to a second coupler 150. The optical path is implemented as a free-space path, an optical fiber, or an optical waveguide.

The reference arm 140, as implemented as a free-space path, an optical fiber, or an optical waveguide, has an additional optical path 142 that provides an additional path length such that the reference arm of an object's 140 path length matches the maximum ranging depth of the TOI system 100. The optical pulsed wavelength-modulated coherent light signals from the at least one sample arm 122 and the reference arm 140 are combined in the coupler 150 to generate an optical interference signal.

The pulsed wavelength-modulated coherent light signals from the at least one sample arm 122 and the reference arm 140 are heterodynes detected to extract the beating frequency from the base signal. The beating signal has a 180° phase difference between the coupler outputs. The balanced detector 160 subtracts the signal from each input channel to extract the interference signal, that is the beating signal.

The optical interference signal is applied to the optical paths 155*a* and 155*b* implemented as a free-space path, an optical fiber, or an optical waveguide. The optical interference signal is applied to the optical paths 155*a* and 155*b*. It is transferred to a balanced photodetector 160 to convert the optical interference signal from the optical paths 155*a* and 155 into an interference electrical signal 162.

The interference electrical signal 162 is generated by the balanced photodetector 160 and transferred to a data acquisition circuit within a signal processor 165. The data acquisition circuit within the signal processor 165 converts the interference electrical signal 162 to digital data. The maximum frequency of the optical interference signal corresponds to the minimum ranging depth of the TOI LiDAR system 100. The optical interference signal is an object's maximum frequency greater than a Nyquist sampling frequency of the digitizer in the data acquisition or the signal processor 165.

The minimum frequency of the optical interference signal, as applied to optical paths 155*a* and 155*b* corresponds to the maximum ranging depth of the TOI LiDAR system 100. The time delay of the detected optical interference is measured at the falling edge of the optical interference signal of an object's envelope.

The digital data is then transmitted to a computer 170 for further processing and display. The signal processor 165, in some embodiments, may be integrated with the computer 170 as a single unit.

In various embodiments, the computer 170 is connected to a modulation/scanning controller 175. In other embodiments, the computer 170 is integrated with the modulation/scanning controller 175. The modulation/scanning controller 175 has a modulation subcircuit that determines the modulation, frequency, and shape of the modulation control signal 177 applied to the coherent light source 105. The modulation/scanning controller 175 further has a scanning control circuit that provides a modulation/scan synchronization signal 179 to the signal processor 165 and the scanner 130. The scanning control circuit creates a desired scan pattern that is used to generate an appropriate modulation/scan synchronization signal 179 that is applied to the scanner 130.

The scanner 130 may be implemented as a 1-dimensional or 2-dimensional scanner to distribute the sample pulsed wavelength-modulated coherent light 135 to form an image based on the TOI measurement. The 1-dimensional scanning pattern may be linear or non-linear in time and may be unidirectional or bidirectional. In some implementations of the TOI Lidar system 100, the 2-dimensional scanning pattern may be linear or non-linear in time. It may be in the form of a raster scan, spiral scan, or other patterns to collect the measurement information. The scanner 130 may be realized mechanically as galvanometer mirrors, micro-electro-mechanical systems (MEMS), piezo actuators, or optically including an acousto-optic (A.O.) deflector or a solid-state scanner. There may be other methods in keeping with the principles of the present disclosure of providing the required scanning motion to collect the measurement information.

Figure 1B:
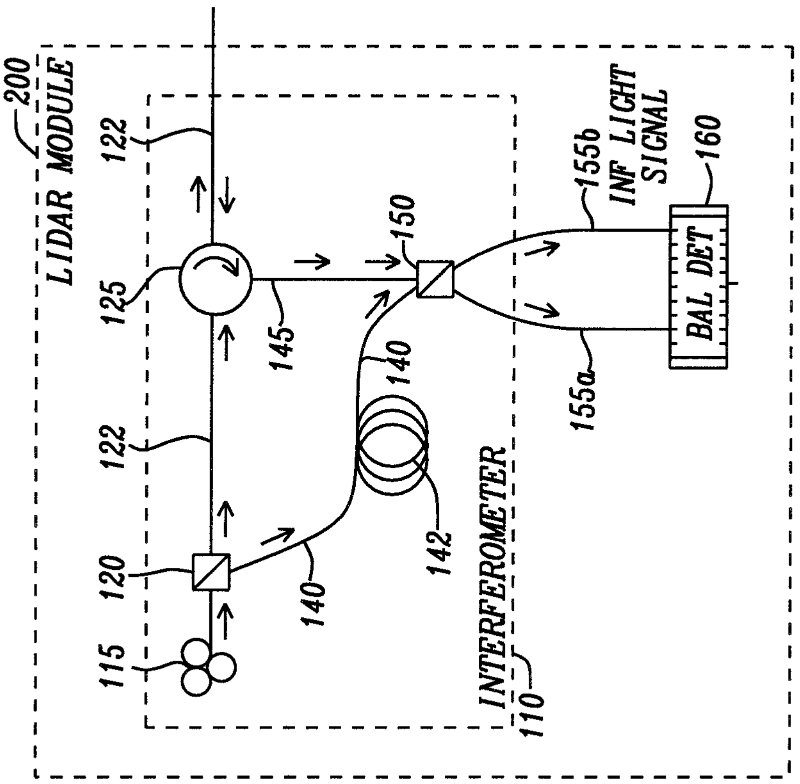
FIG. 1B is a schematic drawing of a LiDAR module embodying the principles of the present disclosure.

FIG. 1B is a schematic drawing of the LiDAR Module 200 embodying the principles of the present disclosure. LiDAR Module 200 has an interferometer 110 and the balanced detector 160. The interferometer 110 and the balanced detector 160 are identical in structure and operation to the interferometer 110 and the balanced detector 160 of the related art, shown in FIG. 1A.

Figure 2:
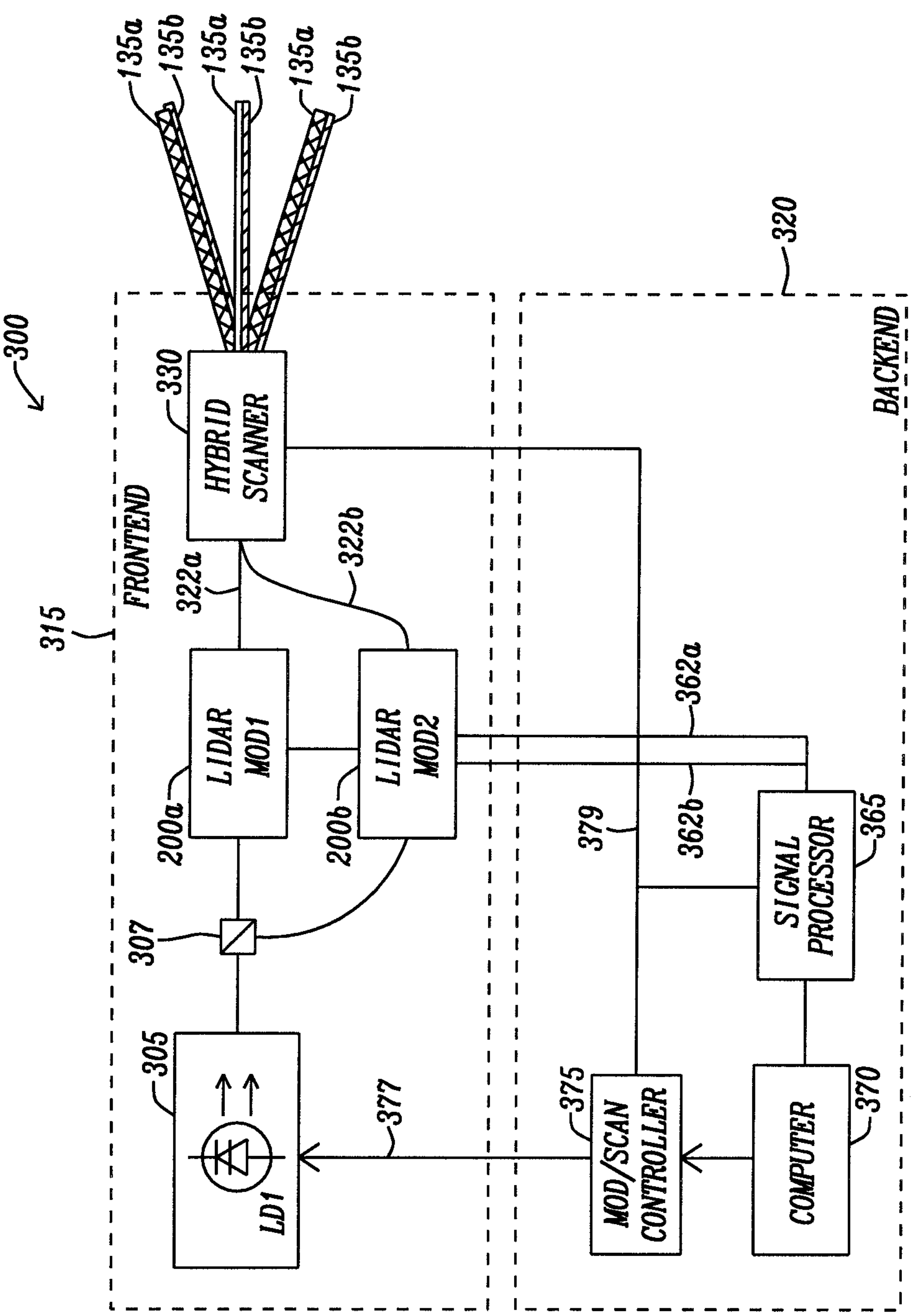
FIG. 2 is a schematic drawing of a Multiplexed LiDAR System embodying the principles of the present disclosure.

FIG. 2 is a schematic drawing of a Multiplexed LiDAR System 300 based on a TOI LiDAR system embodying the principles of the present disclosure. A Multiplexed LiDAR system 300 has a pulsed wavelength-modulated narrow bandwidth light source 305. The pulsed wavelength-modulated light source 305 emits a pulse-modulated coherent light having an output spectrum composed of single or multiple longitudinal modes. A longitudinal mode of a resonant cavity is a particular standing wave pattern formed by waves confined in the cavity. In a laser, the light is amplified in a cavity resonator, usually composed of two or more mirrors. The cavity has mirrored walls that reflect the light to allow standing wave modes to exist in the cavity with little loss. The longitudinal modes correspond to the reflecting wave's wavelengths reinforced by constructive interference after many reflections from the cavity of an object's reflecting surfaces. All other wavelengths are suppressed by destructive interference. A longitudinal mode pattern has its nodes located axially along the length of the cavity. The pulsed wavelength-modulated light source 305 is implemented as one of four types of lasers known in the art and categorized as a solid-state laser, a gas laser, a liquid laser, or a semiconductor laser. In the discussion of the structure of this disclosure, the pulsed wavelength-modulated light source 305 is shown as a coherent light source 305 with its wavelength or frequency controlled by either current or temperature. The modulation of the pulsed wavelength-modulated light source 305 is described hereinafter.

The pulsed wavelength-modulated narrow band light source 305 emits the pulsed wavelength-modulated coherent light and is split by an optical splitter 307 to two LiDAR modules 200*c* and 200*d*. The pulsed wavelength-modulated narrow bandwidth light source 305 emissions travel through free space, an optical fiber, or an optical waveguide to the optical splitter 307. The first leg from the optical splitter 307 is connected to the first LiDAR Module 200*a*, and a second leg of the optical splitter 107 is connected to the second LiDAR Module 200*b*. In various embodiments, an optical switch can be used in place of the optical splitter 307 for applications that require high detection sensitivity, and a slower detection speed is acceptable.

The LiDAR modules 200*c* and 200*d* in various embodiments are structured as described above in FIG. 1B and are implemented as fiber optics, bulk optics, integrated photonic circuitry, or some combinations thereof. The optical pulsed wavelength-modulated coherent light signals are transferred from the LiDAR modules 200*a* and 200*b* to the hybrid scanner 330. The hybrid scanner 300 is implemented as a 1-dimensional or 2-dimensional scanner to distribute the sample pulsed wavelength-modulated coherent light beams 135*a* and 135*b* to form an image based on the TOI measurement. The 1-dimensional scanning pattern may be linear or non-linear in time and may be unidirectional or bidirectional. The sample pulsed wavelength-modulated coherent light beams 135*a* and 135*b* are then back-reflected to the hybrid scanner 330 and transferred to the LiDAR modules 200*a* and 200*b*. The back-reflected sample pulsed wavelength-modulated coherent light 135*a* and 135*b* to the circulator 125 of FIG. 1B and from the circulator 125 to the optical path 145 of the LiDAR modules 200*a* and 200*b* to the optical coupler 150. The reference signal from the reference path 140 is combined with the back-reflected optical signals from the circulator 145 in both of the LiDAR modules 200*a* and 200*b* in the optical coupler 150 to generate the optical interference signal 155*a* and 155*b* of FIG. 1B. Further as shown in FIG. 1B, the back-reflected pulsed wavelength-modulated coherent light signals from the sample arms 122*a* and 122*b* and the reference arm 140 are heterodyne detected to extract the beating frequency from the base signal. The beating signal has a 180° phase difference in the two outputs 155*a* and 155*b* from the coupler 150. The balanced detector 160 subtracts the signal from each input channel to extract the interference signal that is the beating signal.

The optical interference signal is applied to the optical paths 155*a* and 155*b* implemented as a free-space path, an optical fiber, or an optical waveguide. The optical interference signal is applied to the optical paths 155*a* and 155*b* and is transferred to a balanced photodetector 160 to convert the optical interference signals from the optical paths 155*a* and 155*b* of the two interferometers 110 within the two LiDAR modules 200*a* and 200*b* into a first and a second interference electrical signals 362*a* and 362*b* of FIG. 2.

The first interference electrical signal 362*a* and the second interference electrical signal 362*b* are transferred to a data acquisition circuit within a signal processor 365, where the first and second interference electrical signals 362*a* and 362*b* are converted into digital data. In some embodiments, the time delay of the detected electrical interference signal 362*a* and 362*b* can be measured at the rising or falling edge of the electrical interference signal is an object's envelope within a signal processor 365 with analog signal processing circuitry and without being converted into digital data.

The digital data is then transmitted to a computer 370 for further processing and display. The signal processor 365, in some embodiments, may be integrated with the computer 370 as a single unit.

In various embodiments, the computer 370 is connected to a modulation/scanning controller 375. In other embodiments, the computer 370 is integrated with the modulation/scanning controller 375. The modulation/scanning controller 375 has a modulation subcircuit that determines the modulation, frequency, and shape of the modulation control signal 377 applied to the coherent light source 305. The modulation/scanning controller 375 further has a scanning control circuit that provides a modulation/scan synchronization signal 379 to the signal processor 365 and the scanner 330. The modulation/scanning controller 375 creates a desired scan pattern that is used to generate appropriate modulation/scan synchronization signal 379 that is applied to the scanner 330.

The scanner 330 may be implemented as a 1-dimensional or 2-dimensional scanner to distribute the sample pulsed wavelength-modulated coherent light beams 335*a* and 335*b* to form an image based on the TOI measurement. The 1-dimensional scanning pattern may be linear or non-linear in time and may be unidirectional or bidirectional. In some implementations of the TOI LiDAR system 300, the 2-dimensional scanning pattern may be linear or non-linear in time. It may be in the form of a raster scan, spiral scan, or other patterns to collect the measurement information. The scanner 330 may be realized mechanically as galvanometer mirrors, polygon mirrors, micro-electro-mechanical systems (MEMS), piezo actuators, optically including an acousto-optic (A.O.) deflector, or a solid-state scanner. There may be other methods in keeping with the principles of the present disclosure of providing the required scanning motion to collect the measurement information.

Figure 3A:
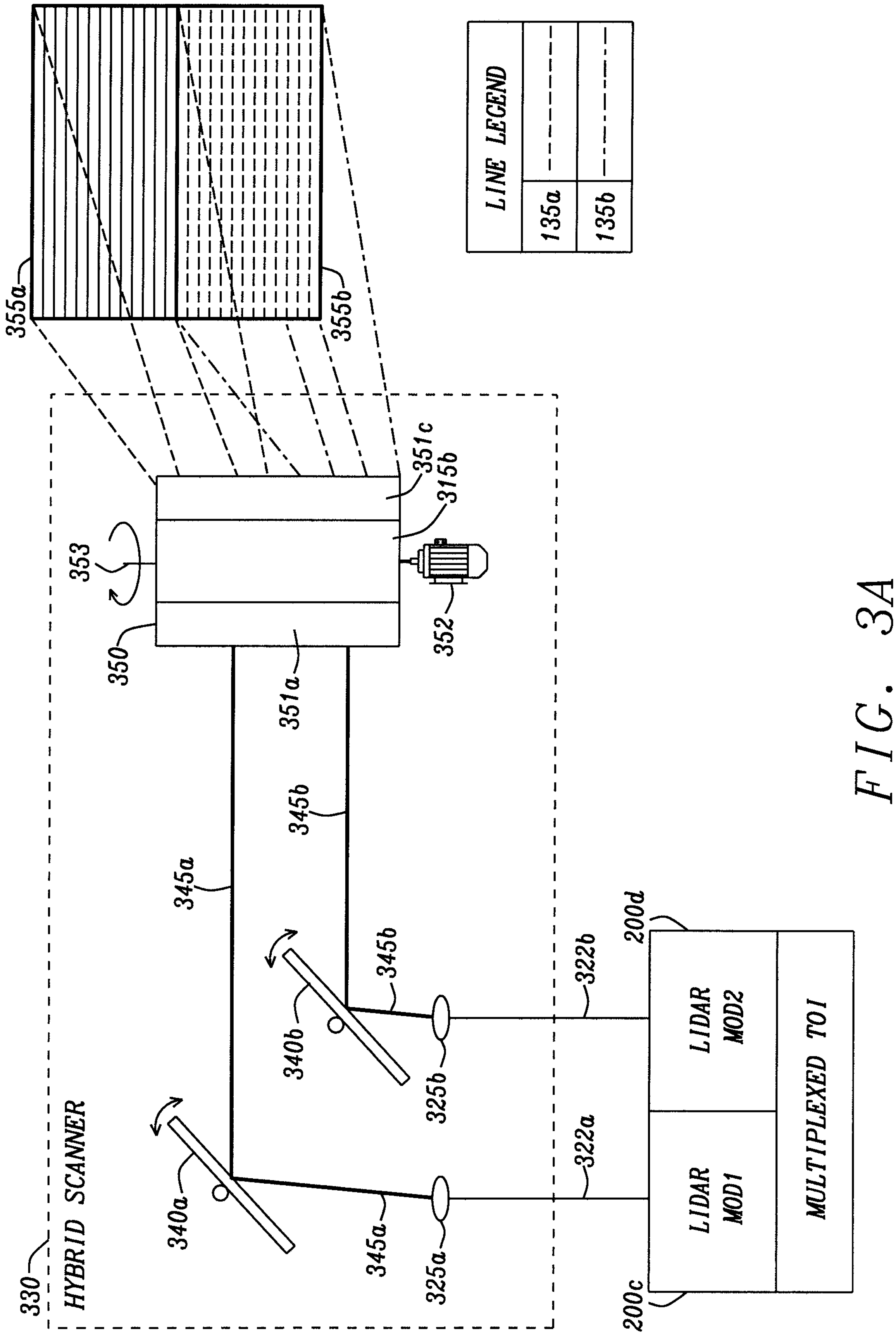
FIG. 3A is a schematic drawing of a scanner configured to scan two illumination light beams from two LiDAR modules of FIG. 1B embodying the principles of the present disclosure, to form a larger scan pattern.
Figure 3B:
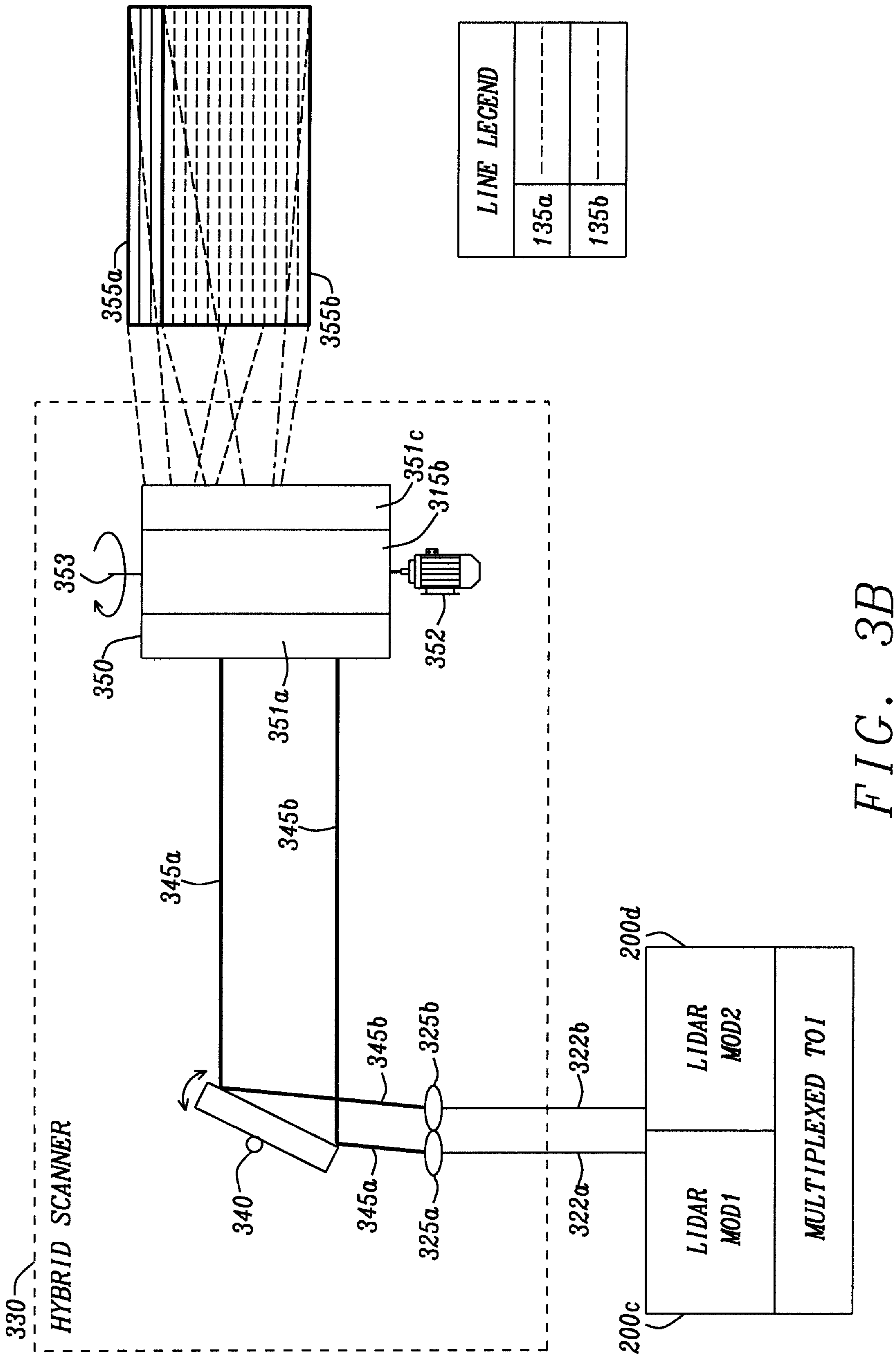
FIG. 3B is a schematic drawing of a scanner configured to scan two illumination light beams from two LiDAR modules of FIG. 1B, embodying the principles of the present disclosure, to form a denser scan pattern.

FIGS. 3A and 3B are schematic drawings of the scanner 330 configured for receiving the sampling arms 322*a* and 322*b* of the LiDAR modules 200*c* and 200*d*, as illustrated in FIG. 1B. The sampling arm 322*a* from the first LiDAR Module 200*c* and the sampling arm 200*d* of the second LiDAR 200*d* are inserted and secured in scanner 330. The distal end of the first sampling arms 322*a* and 322*b* are connected to collimators 325*a* and 325*b* to collimate the sample pulsed wavelength-modulated coherent light beams 322*a* and 322*b*. To enhance overall efficiency for LiDAR operation, the collimators 325*a* and 325*b* require a low numerical aperture for long-distance illumination but a higher numerical aperture for receiving back-reflected pulsed wavelength-modulated coherent light from the object. Thus, the collimators 325*a* and 325*b* may be a single fiberoptic lens with an engineered tip. Hence, the on-axis sample pulsed wavelength-modulated coherent light beams 335*a* and 335*b* coming out through the center portion of the engineered tip are collimated. While the off-axis back-reflected pulsed wavelength-modulated coherent light from the object going through the annular portion of the engineered tip can be coupled back into the sample arm fiber 322*a* and 322*b*. The fiberoptic lens of the collimator can be realized as a gradient-index (GRIN) fiberoptic lens with single-mode fiber, a GRIN fiberoptic lens with few-mode fiber, a fiberoptic ball lens, a GRIN lens assembly, a free-space collimator, or a combination of above. The engineered tip can be a tapered tip, a Fresnel surface, a meta-surface, or a combination thereof.

In FIG. 3A, the pulsed wavelength-modulated coherent light beams 335*a* and 335*b* are directed to slow-axis scanning mirrors 340*a* and 340*b*. The slow-axis scanning mirrors 340*a* and 340*b* are on a first axis. In this instance, the slow-axis scanning mirrors 340*a* and 340*b* are vertically rotated to reflect the pulsed wavelength-modulated coherent light beams 335*a* and 335*b* with a vertical scan pattern. The vertical scan pattern covers a desired field of view. The first and second slow-axis scanning mirrors 340*a* and 340*b* are configured to provide a positional offset so the reflected pulsed wavelength-modulated coherent light beams 345*a* and 345*b* impinge upon different facets of a fast-axis scanning mirror 350. The fast-axis scanning mirror 350 is a polygonal cylinder with each facet 351*a*, 351*b*, and 351*c* of the fast-axis scanning mirror 350 having equally sized rectangular mirrored shapes 351*a*, 351*b*, and 351*c* formed on the outside surface of the polygonal cylinder of the fast-axis scanning mirror 350

The fast-axis scanning mirror 350 is rotated by motor 352 on shaft 353 horizontally to create a horizontal scan pattern. The horizontal scan pattern covers a horizontal field of view. The combination of vertical and horizontal scan patterns produces a first 2-dimensional scan pattern 355*a* and a second 2-dimensional scan pattern 355*b* from the reflected pulsed wavelength-modulated coherent light beams 135*a* and 135*b*, respectively. The positional offset of the first and second slow-axis scanning mirrors 340*a* and 340*b* determines the separation of the first and second 2-dimensional scan patterns 355*a* and 355*b*. The two 2-dimensional scan patterns 355*a* and 355*b* form a combined scan pattern with twice larger scan area compared to each 2-dimensional scan pattern 355*a* and 355*b* and thus increase the effective scan area.

In FIG. 3B, the collimators 325*a* and 325*b* are configured with a positional offset small enough that the pulsed wavelength-modulated coherent light beams 345*a* and 345*b* are directed to a different portion on a single slow-axis scanning mirror 340. The slow-axis scanning mirror 340 is vertically rotated to reflect the pulsed wavelength-modulated coherent light beams 345*a* and 345*b* with a vertical scan pattern. Reflected pulsed wavelength-modulated coherent light beams 345*a* and 345*b* impinge upon different portions of a fast-axis scanning mirror 350. The fast-axis scanning mirror 350 is identical to the fast-axis scanning mirror 350 of FIG. 3A.

The fast-axis scanning mirror 350 is rotated horizontally on shaft 353 by motor 352 to create a horizontal scan pattern. The combination of vertical scan pattern and horizontal scan pattern produces a first 2-dimensional scan pattern 355*a* and a second 2-dimensional scan pattern 355*b* from the reflected pulsed wavelength-modulated coherent light beams 135*a* and 135*b*, respectively. The two 2-dimensional scan patterns 355*a* and 355*b* completely overlap to form a combined scan pattern with twice larger scan pixel density compared to each individual 2-dimensional scan pattern and thus increase the effective scan pixel density or effective scan speed. In some embodiments, the 2-dimensions scan patterns 355*a* and 355*b* will partially overlap such that a portion of combined scan patterns 355*a* and 355*b* have an increased pixel density while increasing the scan pixel area.

Figure 4:
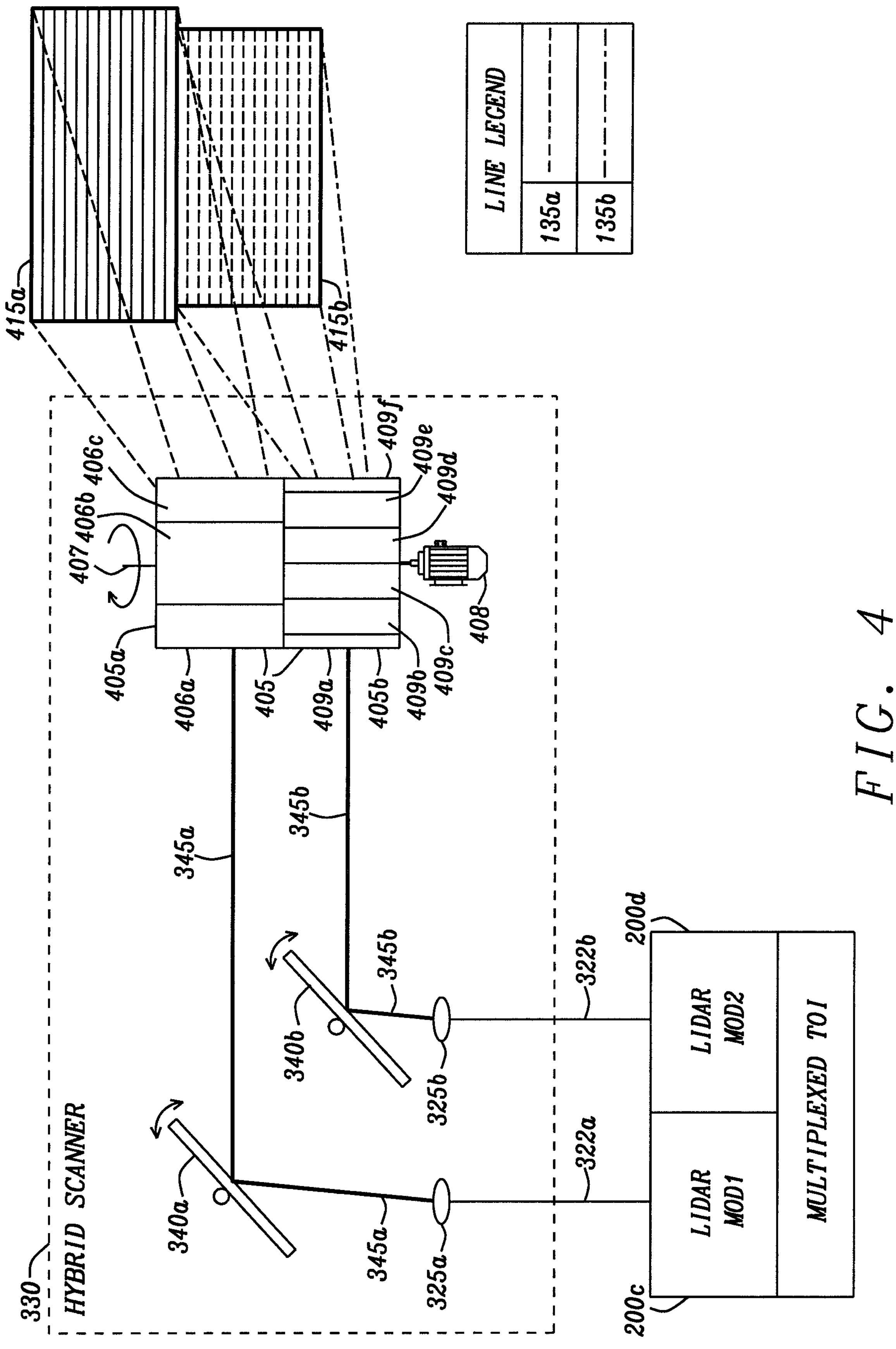
FIG. 4 is a schematic drawing of a scanner configured to scan two illumination light beams from two LiDAR modules of FIG. 1B, embodying the principles of the present disclosure, to form two scan patterns with different scan areas and scan pixel densities.

FIG. 4 is a schematic drawing of the scanner 330 configured for receiving the sampling arms 122*a* and 122*b* of the LiDAR modules 200*c* and 200*d* of FIG. 3A. As illustrated in FIG. 3A, the scanner 330 is configured for receiving the sampling arms 322*a* and 322*b* of the LiDAR modules 200*c* and 200*d*. The pulsed wavelength-modulated coherent light from the sampling arms 322*a* and 322*b* of the LiDAR modules 200*c* and 200*d* is applied to the collimators 325*a* and 325*b*. The pulsed wavelength-modulated coherent light beams 345*a* and 345*b* from collimators 325*a* and 325*b* are directed respectively to slow-axis scanning mirrors 340*a* and 340*b*. The slow-axis scanning mirrors 340*a* and 340*b* are vertically rotated to reflect the pulsed wavelength-modulated coherent light beams 345*a* and 345*b* with a vertical scan pattern. The vertical scan pattern covers a desired field of view. The first and second slow-axis scanning mirrors 340*a* and 340*b* are configured with a positional offset so the reflected pulsed wavelength-modulated coherent light beams 345*a* and 345*b* impinge upon different portions of a fast-axis scanning mirror 405. The fast-axis scanning mirror 405 is a rotational polygonal mirror that consists of two different sets of facet configurations, including a low facet portion (a fewer number of facets) 405*a* and a high facet portion (a greater number of facets) 405*b*. The low facet portion 405*a* has each facet 406*a*, 406*b*, and 406*c*, and the high facet portion 405*b* has each facet 409*a*, 409*b*, 409*c* 409*d*, 409*e*, and 409*f* formed of equally sized rectangular mirrored shapes 409*a*, 409*b*, 409*c* 409*d*, 409*e*, and 409*f* formed on the outside surface of the polygonal cylinder of the fast-axis scanning mirror 405.

The first reflected pulsed wavelength-modulated coherent light impinges upon the low facet portion 405*a* of the polygon mirror 405, and the second reflected pulsed wavelength-modulated coherent light 405*b* impinges upon the high facet portion 405*b* of the polygon mirror 405. Alternately, but not shown, the polygon mirror 405 could be inverted with the second back-reflected pulsed wavelength-modulated coherent light beams 345*b* impinging upon the low facet portion 405*b* and the first reflected pulsed wavelength-modulated coherent light beams 345*a* impinging upon the high facet portion 405*b*. The first instance results in the pulsed wavelength-modulated coherent light beam 135*a* forming a first 2-dimensional scan pattern 415*a* that has a broader scan area and lower scan pixel density, and the pulsed wavelength-modulated coherent light beams 135*b* forming a second 2-dimensional scan pattern 415*b* has a narrower scan area and higher scan pixel density. This implementation enables the Multiplex LiDAR system to accommodate different scanning requirements and parameters simultaneously, including, but not limited to, fields of view (F.O.V.s) and pixel density for near/far field image formation.

As noted above, the motor 408 rotates the shaft 407 to rotate the fast-axis scanning mirror 405.

Figure 5A:
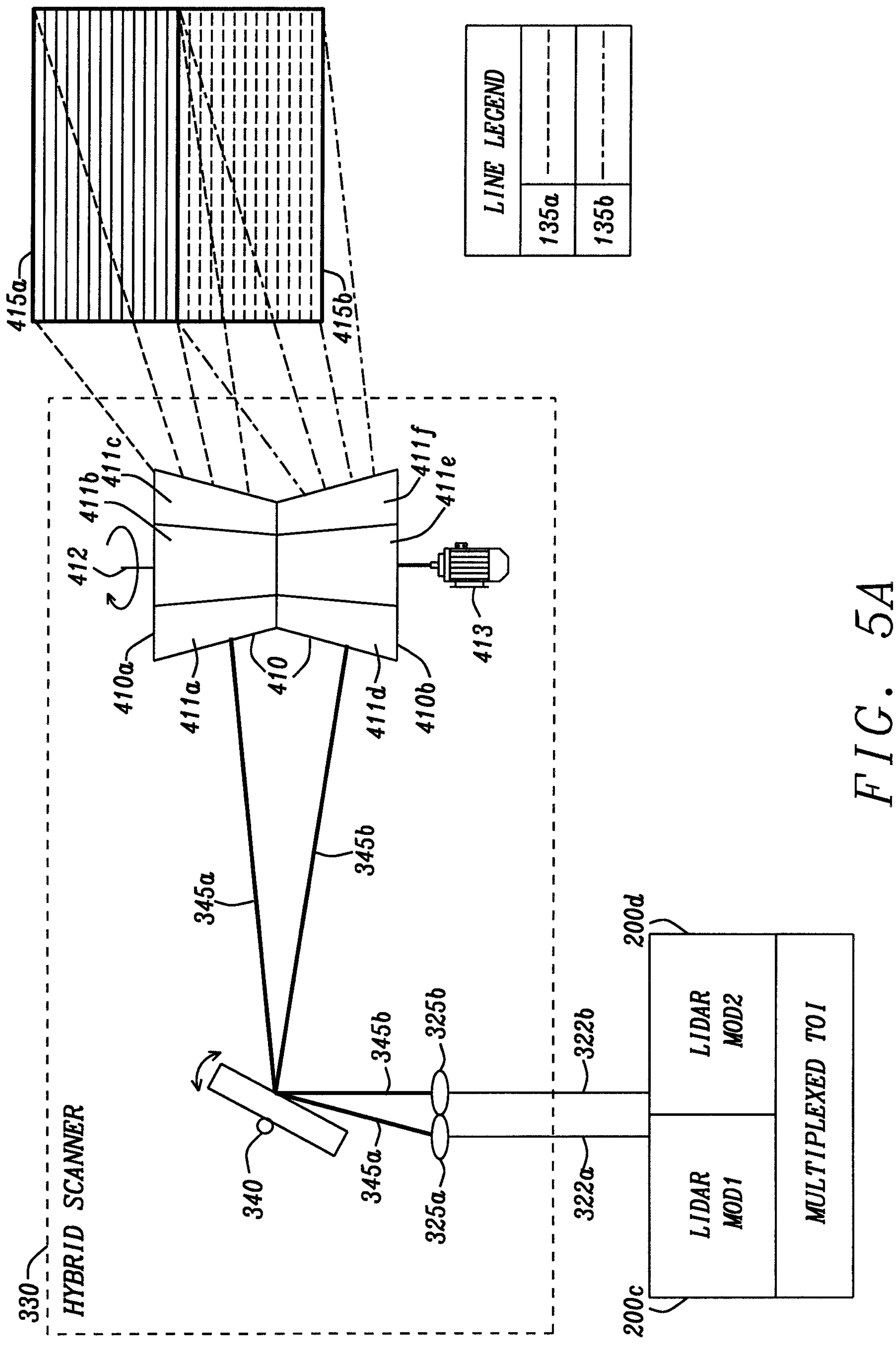
FIG. 5A is a schematic drawing of an angled-polygonal-mirror-based scanner configured to scan two illumination light beams from two LiDAR modules of FIG. 1B, embodying the principles of the present disclosure, to form a larger scan pattern.
Figure 5B:
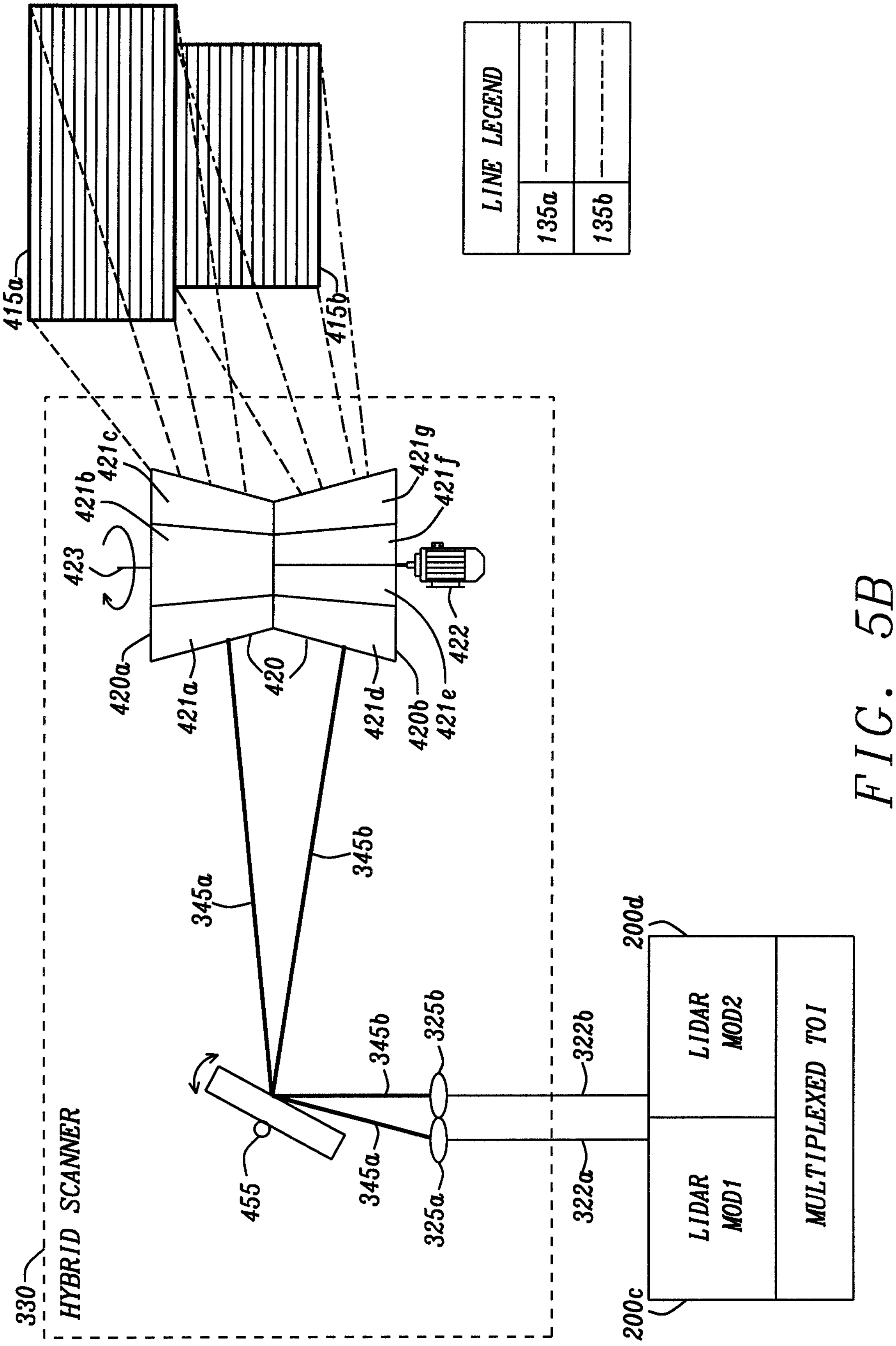
FIG. 5B is a schematic drawing of an angled-polygonal-mirror based-scanner configured to scan two illumination light beams from two LiDAR modules of FIG. 1B, embodying the principles of the present disclosure, to form two scan patterns with different scan areas and scan pixel densities.

FIGS. 5A and 5B are schematic drawings of the scanner 130 configured for receiving the sampling arms. As illustrated in FIG. 5A, scanner 330 is configured for receiving the sampling arms 322*a* and 322*b* of the interferometers 110*a* and 110*b* of the LiDAR modules 200*c* and 220*d*. The collimators 325*a* and 325*b* are configured with a positional offset and an angular offset small enough that the pulsed wavelength-modulated coherent light beams 325*a* and 325*b* are directed to different portions on a single slow-axis scanning mirror 340. The slow-axis scanning mirror 340 is vertically rotated to reflect the pulsed wavelength-modulated coherent light beams 325*a* and 325*b* with a vertical scan pattern. The reflected pulsed wavelength-modulated coherent light beams 345*a* and 345*b* impinge upon different portions of a fast-axis scanning mirror 410, The fast-axis scanning mirror 410 has two polygonal cylindrical sections 410*a* and 410*b*. The first polygonal cylindrical section 410*a* has a plurality of isosceles trapezoidal facet mirrors 411*a*, 4116*b*, and 411*c*. The isosceles trapezoidal facet mirrors 411*a*, 4116*b*, and 411*c* are formed on the facet surfaces of the first polygonal cylindrical section 410*a*, with the upper edges being longer than the lower edges.

The second polygonal cylindrical section 410*b* has a plurality of isosceles trapezoidal facet mirrors 411*d*, 4116*e*, and 411*f*. The isosceles trapezoidal facet mirrors 411*d*, 4116*e*, and 411*f* are formed on the facet surfaces of the first polygonal cylindrical section 410*b*, with the lower edges being longer than the upper edges.

The fast-axis scanning mirror 410 with the isosceles trapezoidal facet mirrors 411*a*, 4116*b*, 411*c* 411*d*, 4116*e*, and 411*f* compensate for the angle offset of the reflected pulsed wavelength-modulated coherent light beams 345*a* and 345*b*. The fast-axis scanning mirror 410 is rotated horizontally by motor 412 through the shaft 413 to create a horizontal scan pattern. The combination of vertical scan pattern and horizontal scan pattern produces a first 2-dimensional scan pattern 415*a* and a second 2-dimensional scan pattern 415*b* to completely overlap the two 2-dimensional scan patterns 415*a* and 415*b* from the reflected pulsed wavelength-modulated coherent light beams 135*a* and 135*b*, respectively. The two 2-dimensional scan patterns 415*a* and 415*b* form a combined scan pattern with a scan pixel density that is two times larger than each individual 2-dimensional scan pattern and thus increases the effective scan pixel density or effective scan speed. In some embodiments, the 2-dimensions scan patterns 415*a* and 415*b* will partially overlap such that a portion of combined scan patterns 415*a* and 415*b* have an increased pixel density while increasing the scan pixel area.

In FIG. 5B, the basic structure of the hybrid scanner 330 is identical to that of the hybrid scanner 330 of FIG. 5A. The fast-axis scanning mirror 420 is a rotational polygonal mirror. The rotational polygonal mirror 420 consists of two different polygonal cylindrical sections 420*a* and 420*b*, including a low facet portion 420*a* with the fewest facets and a second portion 420*b*, with the most facets. The first reflected pulsed wavelength-modulated coherent light beam 135*a* impinges upon the second portion 420*a* of the polygon mirror 420. The second reflected pulsed wavelength-modulated coherent light beams 135*b* impinge upon the first portion 420*b* of the rotational polygonal mirror 420 and result in a first 2-dimensional scan pattern 415*a* with broader scan area and lower scan pixel density and a second 2-dimensional scan pattern 415*b* with narrower scan area and higher scan pixel density. This implementation enables the Multiplex LiDAR system 300 of FIG. 2 to accommodate different scanning requirements and parameters and simultaneously including, but are not limited to, fields of view (FOVs) and pixel density for near/far field image formation.

Figure 6A:
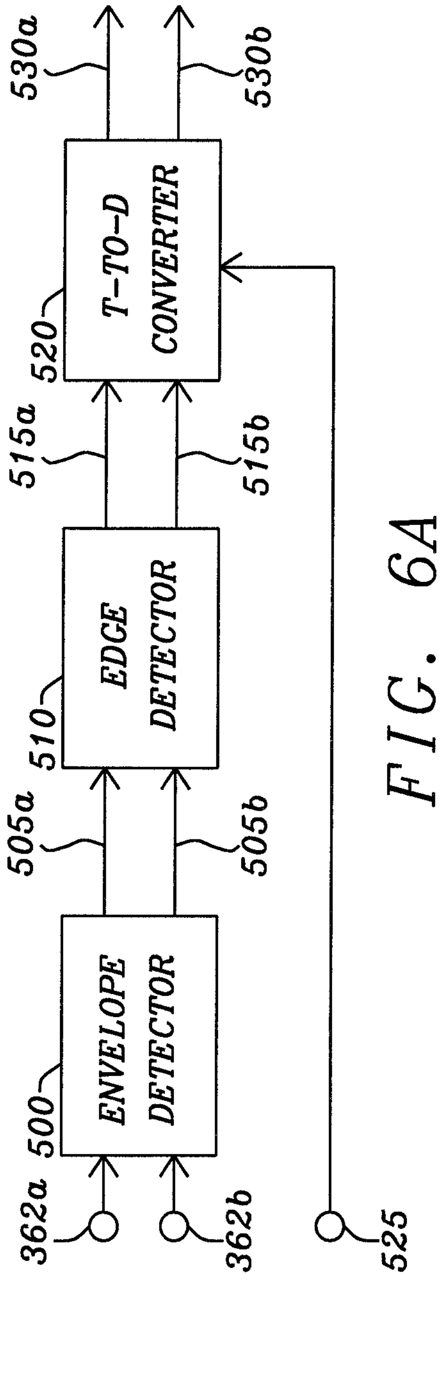
FIG. 6A is a block diagram of an electrical TOI measurement circuit illustrating a program structure of a signal processor configured for performing a multiplexed TOI LiDAR-based distance measurement embodies the principles of the present disclosure.

FIG. 6A is a block diagram of an electrical TOI measurement circuit included within the signal processor. The interference electrical signals 362*a* and 362*b* of FIG. 2 generated from the LiDAR modules 200*a* and 200*b* are received by a multi-channel envelope detector 500 and converted to an envelope 505*a* and 505*b* of the interference electrical signals 362*a* and 362*b*. The multi-channel envelope detector 500 is implemented as a radio frequency (RF) power detector, a root mean square (RMS) detector, or a frequency demodulator. The RF power detector, the RMS detector, or the frequency demodulator are known in the art and are commercially available devices. The RF power detector, the RMS detector, or the frequency demodulator remove the high-frequency components in the electrical interference signal 362*a* and 362*b* and thus extract the envelope of the interference electrical signal 362*a* and 362*b*.

The envelope signals 505*a* and 505*b* are transferred to a multi-channel edge detector 510. The multi-channel edge detector 510 determines a pulse event and places the pulse event at the edge detector, an object's output 510. The pulse event indicates the leading or falling edge of the envelope signals 505*a* and 505*b*. The multi-channel edge detector 510 is realized as an edge-to-glitch converter, an XOR gate and delay circuit, a differentiator circuit, or the like. The edge-to-glitch converter, the XOR gate, and the delay circuit, the differentiator circuit, are similarly known in the art and are commercially available.

The edge detector of an object's 510 outputs 515*a* and 515*b* are connected to inputs of a multi-channel time-to-digital converter 520. The multi-channel time-to-digital converter 520 generates a time difference signal transferred to the outputs 530*a* and 530*b* of the multi-channel time-to-digital converter 520. The time difference signal at the output 530*a* and 530*b* of the multi-channel time-to-digital converter 520 indicates the time between the rising edge or falling edge of the pulse events 505*a* and 505*b* and the pulse event 525. The pulse event 525 corresponds to the rising or falling edge of the light source modulating signal 377 as transferred from the modulation/scanning controller 375. The pulse event 525 is the trigger for starting the multi-channel time-to-digital converter 520 in counting the time intervals. The pulse output 515*a* and 515*b* of the multi-channel edge detector 510 provide the pulse event for terminating the counting of the time intervals by the multi-channel time-to-digital converter 520. A series of time difference signals at the outputs 530*a* and 530*b* of the multi-channel time-to-digital converter 520 are translated into the depth measurements to form images displayed by the computer 170.

Figure 6B:
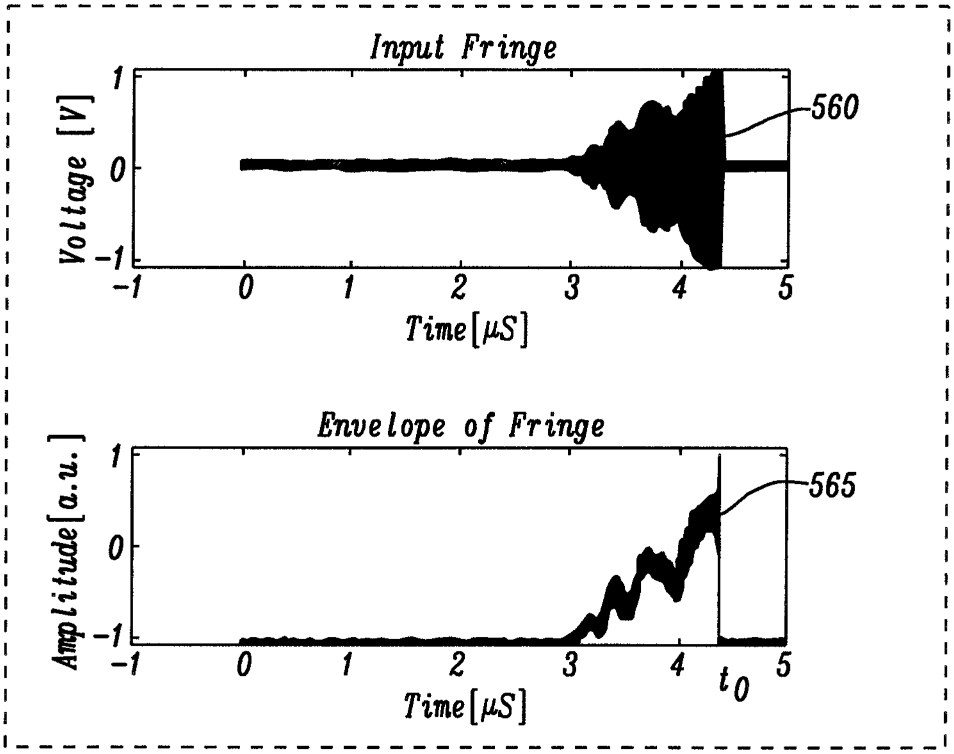
FIG. 6B is a plot of the sample arm's back-reflected pulse fringe at zero (0) meter location and envelope, embodying the principles of the present disclosure.
Figure 6C:
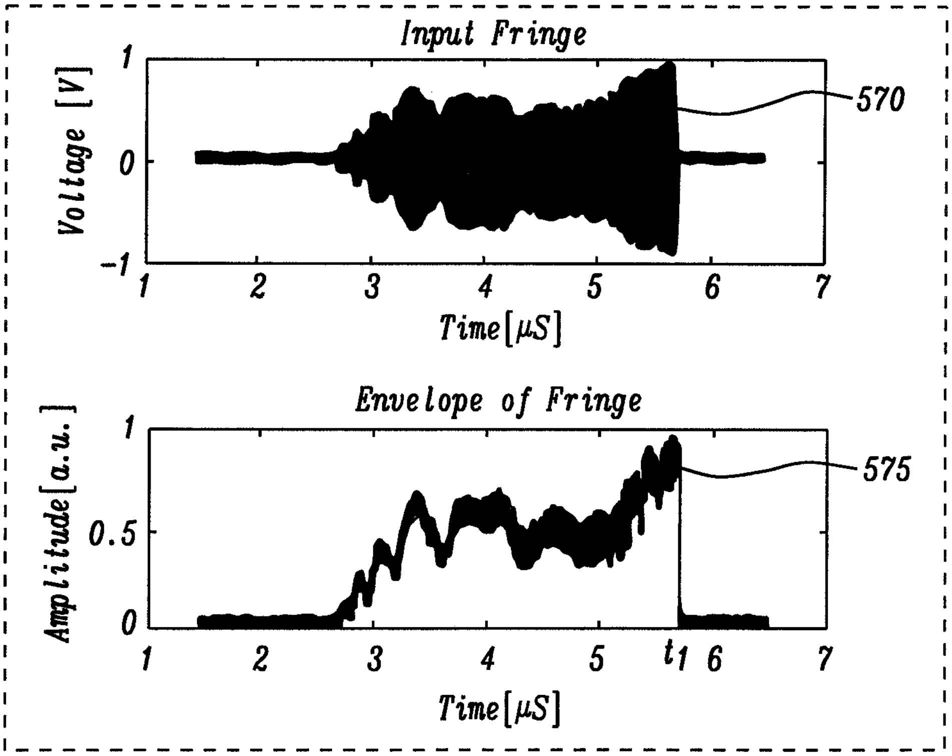
FIG. 6C is a plot of the sample arm's back-reflected pulse fringe at a 180-meter location and envelope, embodying the principles of the present disclosure.

FIG. 6B is a plot of an object's pulse input fringe 560 and envelope 565, embodying the principles of the present disclosure. The plots of FIG. 6B are an example of the electrical interference signal of the prototype TOI system 300 of FIG. 2 detecting an object at a zero (0) meter location. FIG. 6C is a plot of another object's back-reflected pulse fringe 570 and envelope 575, embodying the principles of the present disclosure. The plots of FIG. 6C are an example electrical interference signal of the prototype TOI system 300 detecting an object at a 180 m location. The multi-channel edge detector 510 of FIG. 6A determines the time of the falling edge $t_0$ of the envelope of fringe signal 565 and the time of the falling edge $t_1$ of the envelope of fringe signal 575. The multi-channel time-to-digital converter 520 counts the time interval between the falling edge time $t_0$, and the falling edge time $t_1$. The distance from the object being measured is determined by the equation:

$$\text{Distance}=c*(t_0-t_1)$$

Where:

c is the speed of light.

$t_0$ is the falling edge time when object is at 0 m.

$t_1$ is the falling edge time when object is at 180 m.

A series of time difference signals at the outputs 530*a* and 530*b* of the multi-channel time-to-digital converter 520 can be translated into the depth information and form images displayed by the computer 370.

Figure 7:
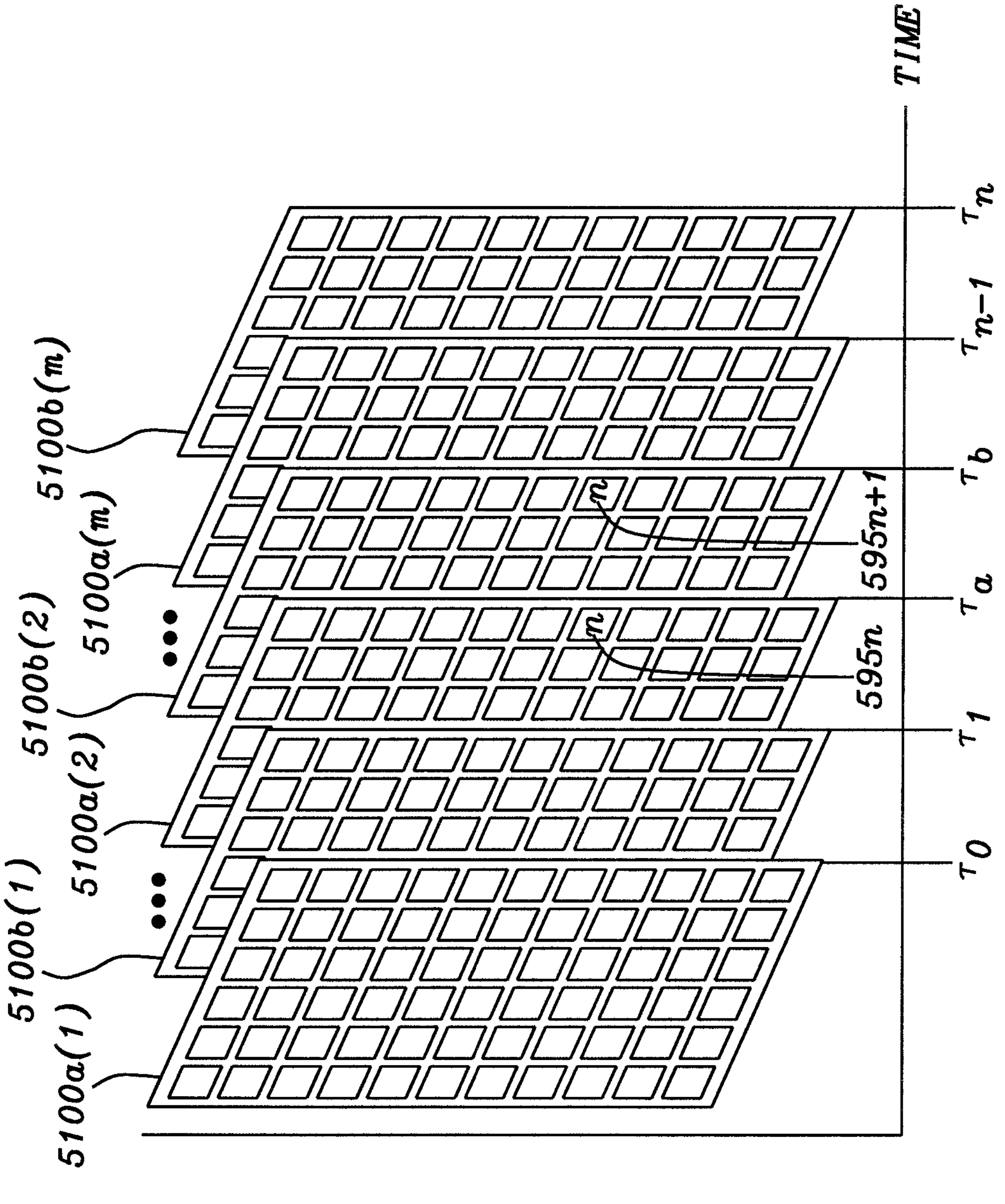
FIG. 7 illustrates the frame-based velocity measurement method of the TOI LIDAR system embodying the principles of the present disclosure.

FIG. 7 illustrates the frame-based velocity measurement method using the Multiplexed LiDAR system embodying the principles of the present disclosure. The Multiplexed LiDAR System can be configured so that a small time delay is encoded in the second TOI modules, so the frames 590*a*(1), 590*a*(2), . . . , 590*a*(*m*), and 590*b*(1), 590*b*(2), . . . , 590*b*(*m*), are captured in an interleaved manner by the TOI modules 200*a* and 200*b* of FIG. 2, respectively, and represents a first and a second interference electrical signals 362*a* and 362*b* of FIG. 2

The data 595*a* and 595*b* are transferred to the signal processor 365 and processed as described in FIG. 6A to thus determine the rising edges or falling edges of the data. Therefore, determining the data and an object's rising edges or falling edges provides the time difference between the data 595a and 595b. The distance between the data is then determined as the time difference ($t_b-t_a$) between the data 595a and 595b. The time difference ($t_b-t_a$) between the data 595a and 595b is multiplied by the frame rate of the optical interference signal and object's sampling applied to optical paths of the LiDAR modules 200a and 200b to determine the velocity of the object being measured.

Figure 8A:
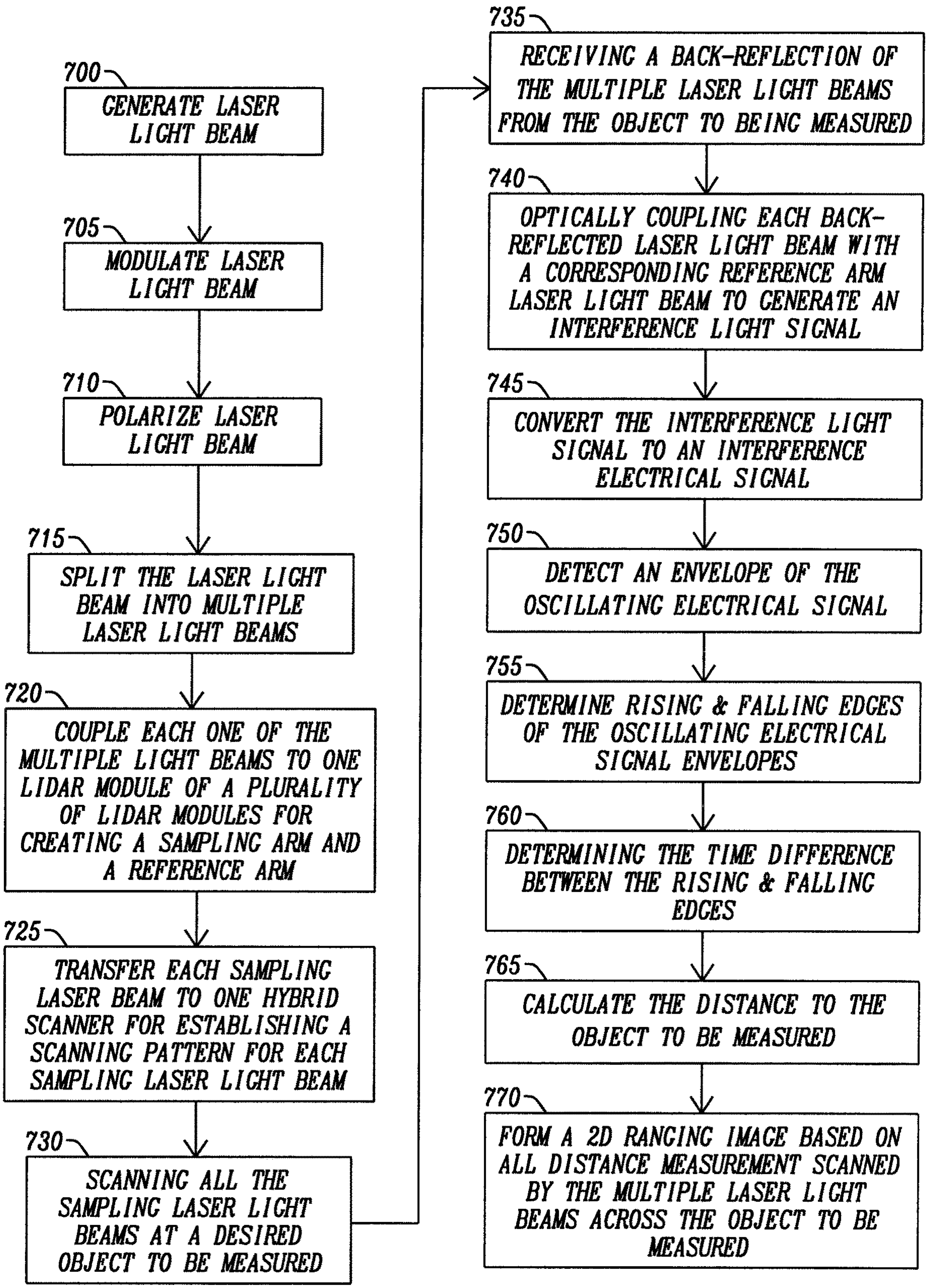
FIG. 8A is a flowchart of a method for determining an object's distance employing multiplexed distance measurement embodying the principles of the present disclosure.

FIG. 8A is a flowchart of a method for determining an object's distance employing a TOI based Multiplexed LiDAR system embodying the principles of the present disclosure. A laser light beam is generated (Box 700). The laser light beam is modulated (Box 705) with a wavelength-modulated or frequency-modulated signal to adjust the laser light beam object's wavelength or frequency. The laser light beam is then polarized (Box 710) to adjust the laser light and an object's polarization states to maximize the amplitude of the optical interference signal or electrical interference signal.

The laser light beam is optically split (Box 715) into multiple light beams, and each of the split laser light beams is coupled (Box 720) to one LiDAR module to create a sampling arm and a reference arm. Each sampling arm is connected (Box 725) to one hybrid scanner to establish a scanning pattern for each sampling laser light beam. Each sampling laser beam scans the object to be measured (730). A fractional part of each laser coherent light beam is back-reflected from the object to be measured and received (Box 735) by each hybrid scanner associated with the back-reflected pulsed wavelength-modulated coherent laser beam. The back-reflected pulsed wavelength-modulated coherent laser beam is coupled (Box 740) to the optical circulator of the interferometer to an optical coupler to be combined with the reference pulsed wavelength-modulated coherent laser beam to form an optical interference signal. The optical interference signal is converted (Box 745) to an oscillating electrical interference signal.

The electrical interference signals undergo an envelope detection process to identify (Box 750) the envelopes of the electrical interference signal. The times of the rising or the falling edges of the envelope rising or falling edges of the envelope of the digitized electrical interference signal are determined (Box 755). The time difference between the rising or falling edges of the envelopes of the electrical interference signals and a modulation/scan synchronization signal is determined (Box 760), and the distance to the object to be measured is calculated (Box 765). As the multiple laser light beams are scanned at the object, a two-dimensional ranging image is formed based on all distances measured and the angular location of the scanner (Box 760).

Figure 8B:
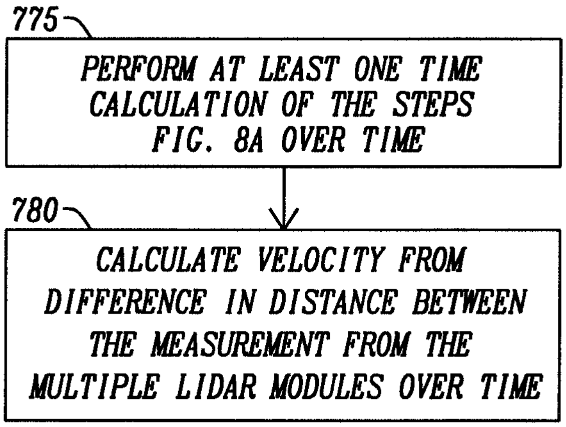
FIG. 8B is a flowchart of a method for determining an object's velocity employing multiplexed distance measurement embodying the principles of the present disclosure.

FIG. 8B is a flowchart of a method for determining an object's velocity employing a Time of Interference (TOI) based Multiplexed LiDAR system embodying the principles of the present disclosure. The method for determining an object's velocity utilizing TOI based Multiplexed LiDAR system begins with performing (Box 775) the steps of the method of FIG. 8A multiple times. The object's velocity is determined (Box 780) as the difference in distance measured by the multiple TOI modules over time.

Figure 9A:
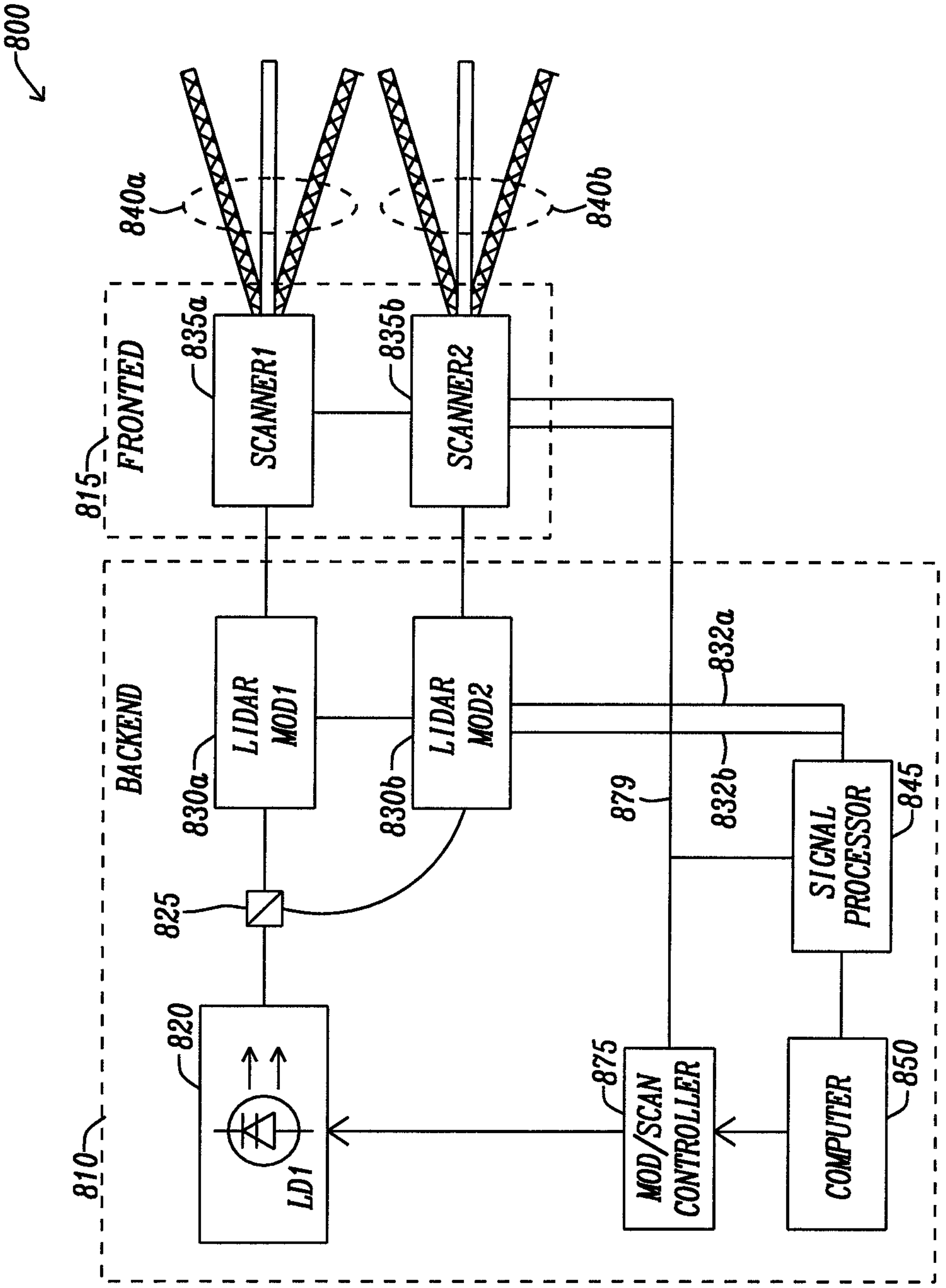
FIG. 9A is a schematic drawing of a Multiplexed LiDAR System with multiple frontend scanners embodying the principles of the present disclosure.

In various embodiments, each LiDAR module in the Multiplexed LiDAR system is equipped with multiple scanners so that the distance of multiple objects at different locations is measured simultaneously by a single LiDAR system. FIG. 9A is a schematic drawing of a Multiplexed LiDAR system 500 based on TOI LiDAR embodying the principles of the present disclosure. Instead of using a single scanner like the system described in FIG. 2, the sample arms of the first and the second TOI modules 200a and 200b are connected separately to a first scanner 805a and a second scanner 805b to physically transfer the first sample pulsed wavelength-modulated coherent light 135a and the second sample pulsed wavelength-modulated coherent light 135b to scan different objects.

Figure 9B:
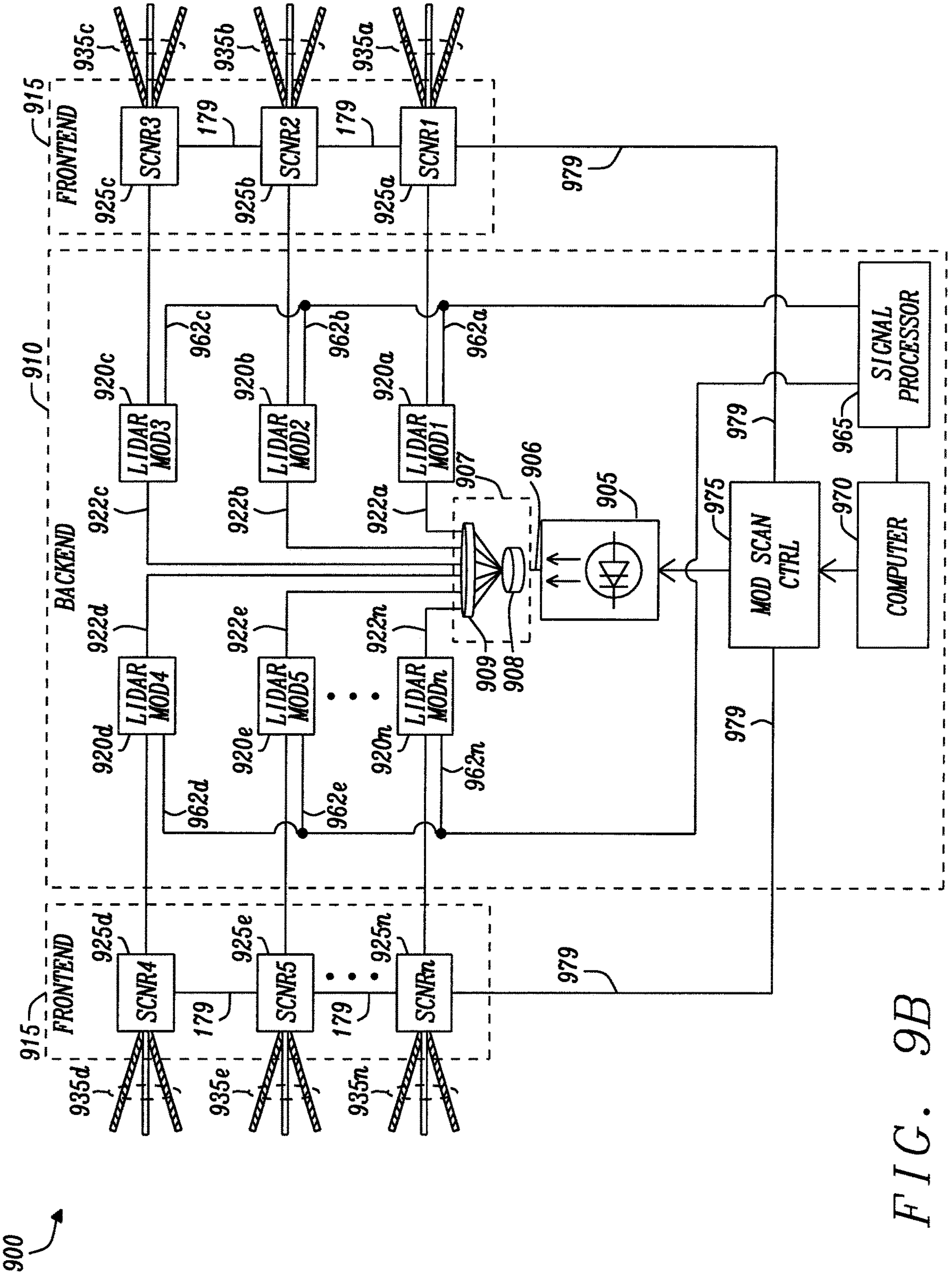
FIG. 9B is a schematic drawing of an implementation of the Multiplexed LiDAR System with multiple frontend scanners embodying the principles of the present disclosure.

FIG. 9B is a schematic drawing of the Multiplexed LiDAR system 900 for multi-directional distance measurement embodying the principles of the present disclosure. A single backend system 910 comprises one pulsed wavelength-modulated light source 905 that transfers the pulsed wavelength-modulated light beam 906 to a multiple beam splitter 907. An exemplary multiple beam splitter 907 includes a diffractive beam splitter 908 that provides the number of separate beams required by the LiDAR system 900. The multiple wavelength-modulated light beams are directed to a focusing lens 909 for re-collimating each light beam. Each light beam is transferred to a TOI LiDAR module 920a, 920b, 920c, 920d, 920e, . . . , 920n. In various embodiments, a multi-channel optical switch can be used in place of the multiple beam splitter 907 for applications that require high detection sensitivity, and a narrower field of view or slower detection speed is acceptable.

Each of the LiDAR modules 920a, 920b, 920c, 920d, 920e, . . . , 920n are connected to a scanner 925a, 925b, 925c, 925d, 925e, . . . , 925n within the front end of the Multiplexed LiDAR system 800. Each scanner 925a, 925b, 925c, 925d, 925e, . . . , 925n is configured as a 1-dimensional or 2-dimensional scanner as described in FIGS. 3A, 3A, 4, 5A, and 5B. The scanners 925a, 925b, 925c, 925d, 925e, . . . , 925n transfer the sample pulsed wavelength-modulated coherent light beams 935a, 935b, 935c, 935d, 935e, . . . , 935n to scan one or more objects in different directions within the circumference of the surrounding environment.

The back-reflected wavelength-modulated coherent light beams 935a, 935b, 935c, 935d, 935e, . . . , 935n from the scanned object(s) are received by the scanners 925a, 925b, 925c, 925d, 925e, . . . , 925n and transferred to the LiDAR modules 920a, 920b, 920c, 920d, 920e, . . . , 920n to form an image based on the TOI measurement. The 1-dimensional scanning pattern may be linear or non-linear in time and may be unidirectional or bidirectional. In some implementations of the Multiplexed LIDAR system 900, the 2-dimensional scanning pattern may be linear or non-linear in time. It may be in the form of a raster scan, spiral scan, or other patterns to collect the measurement information.

In various embodiments of FIG. 9B, each of the scanners 925a, 925b, 925c, 925d, 925e, . . . , 925n operates with a different scanning pattern and scanning speed for different types of objects or purposes. The scanning patterns may be a 1-dimensional scan with a narrow scanning range (lower than 5 degrees) and high scanning speed (higher than 50 Hz), a 1-dimensional scan with a high scanning range (larger than 5 degrees) and low scanning speed (lower than 50 Hz), 2-dimensional scan with narrow scanning range (lower than 5 degrees in each dimension) and high scanning speed (higher than 20 Hz), 2-dimensional scan with high scanning range (higher than 5 degrees in each dimension) and low scanning speed (lower than 20 Hz), or a combination thereof.

The back-reflected wavelength-modulated coherent light beams 935a, 935b, 935c, 935d, 935e, . . . , 935n, received by the TOI LiDAR modules 920a, 920b, 920c, 920d, 920e, . . . , 920n are processed by the TOI LiDAR modules 920a, 920b, 920c, 920d, 920e, . . . , 920n. The processed back-reflected wavelength-modulated coherent light beams

935*a*, 935*b*, 935*c*, 935*d*, 935*e*, . . . , 935*n* are transferred as the back-reflected wavelength-modulated coherent light beams 962*a*, 962*b*, 962*c*, 935*d*, 962*e*, . . . , 962*n* to the signal processor 965. The signal processor 965 has a plurality of the balanced detectors 160 of FIG. 1B that receives the back-reflected wavelength-modulated coherent light beams 935*a*, 935*b*, 935*c*, 935*d*, 935*e*, . . . , 935*n*. The balance detectors 160 of FIG. 1B convert the light beams 935*a*, 935*b*, 935*c*, 935*d*, 935*e*, . . . , 935*n* to electrical signals that are processed by the computer 970 to generate the image based on the age based on the TOI measurement.

The scanners 925*a*, 925*b*, 925*c*, 925*d*, 925*e*, . . . , 925*n* may be realized mechanically as galvanometer mirrors, polygon mirrors, micro-electro-mechanical systems (MEMS), piezo actuators, optically including acousto-optic (AO) deflector, or a solid-state scanner. There may be other methods in keeping with the principles of the present disclosure of providing the required scanning motion to collect the measurement information.

Figure 10A:
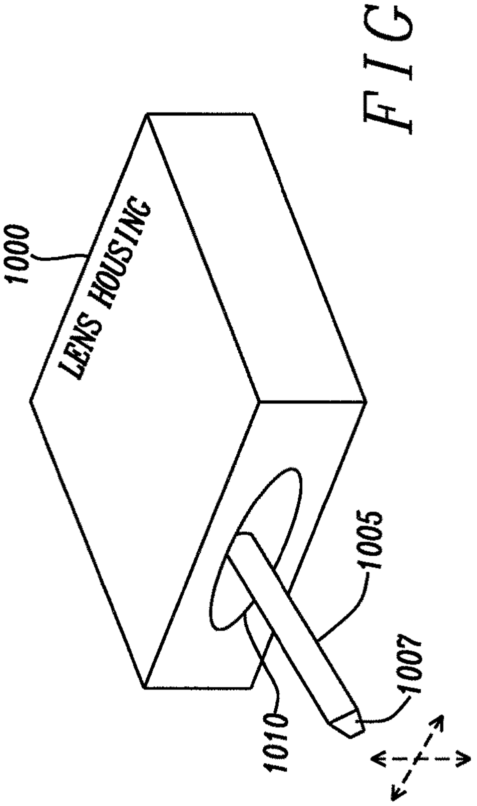
FIG. 10A illustrates a lens housing for a multiplexed LIDAR system with a single frontend lens or collimator for determining the distance and/or velocity of an object from the multiplexed LIDAR system embodying the principles of the present disclosure.
Figure 10B:
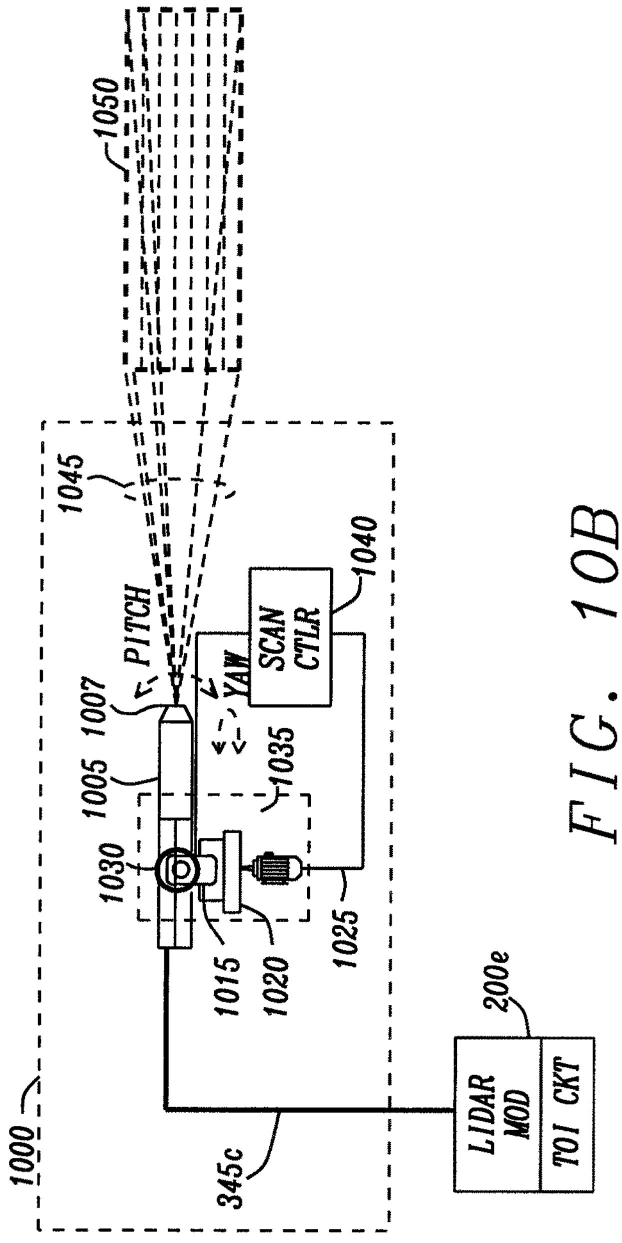
FIG. 10B is a schematic of the mechanism for controlling the single frontend lens or collimator within the lens housing for a multiplexed LIDAR system embodying the principles of the present disclosure.

FIG. 10A is an illustration of a lens housing 1000 for a multiplexed LIDAR system 1900 with a single fiberoptic laser element 1005 for determining the distance and/or velocity of an object from a multiplexed LIDAR system embodying the principles of the present disclosure. The fiberoptic laser element 1005 has a lens or collimator 1007 at the front end of the fiberoptic laser element 1005. The lens housing 1000 has an opening 1010 configured for allowing the fiberoptic laser element 1005 to move in a horizontal and vertical direction. FIG. 10B is a schematic of the mechanism for controlling the single fiberoptic laser element 1005 embodying the principles of the present disclosure. The fiberoptic laser element 1005 with the lens or collimator 1007 is secured to the pitch and yaw control mechanism 1015 within the lens housing 1000 for a multiplexed LIDAR system. The pitch and yaw control mechanism 1015 has a horizontal yaw control device 1020 and a vertical pitch control aiming device 1030. The fiberoptic laser element 1005 is secured to the vertical pitch control aiming device 1030 for rotating the fiberoptic laser element 1005 through a vertical range of motion. The vertical pitch control aiming device 1030 is attached to a motor 1035. The motor 1035 controls the vertical motion of the fiberoptic laser element 1005. The vertical pitch control aiming device 1030 is mounted to the horizontal yaw control device 1020. The horizontal yaw control device 1020 rotates in the horizontal plane of a desired range of motion.

A LIDAR module 200*e* is connected to a coherent light source 905, as shown in FIG. 9A. The LIDAR module 200*e* is connected to a fiberoptic cable 345*c* to transfer the modulated light beam to the light element 1005. The scan controller 1040 provides the rotational control to the motors 1025 and 1035 to fix the horizontal (yaw) and vertical (pitch) motion of the light beams 1045 to define the 1-dimensional scan field of the individual line scans 1050.

Figure 10C:
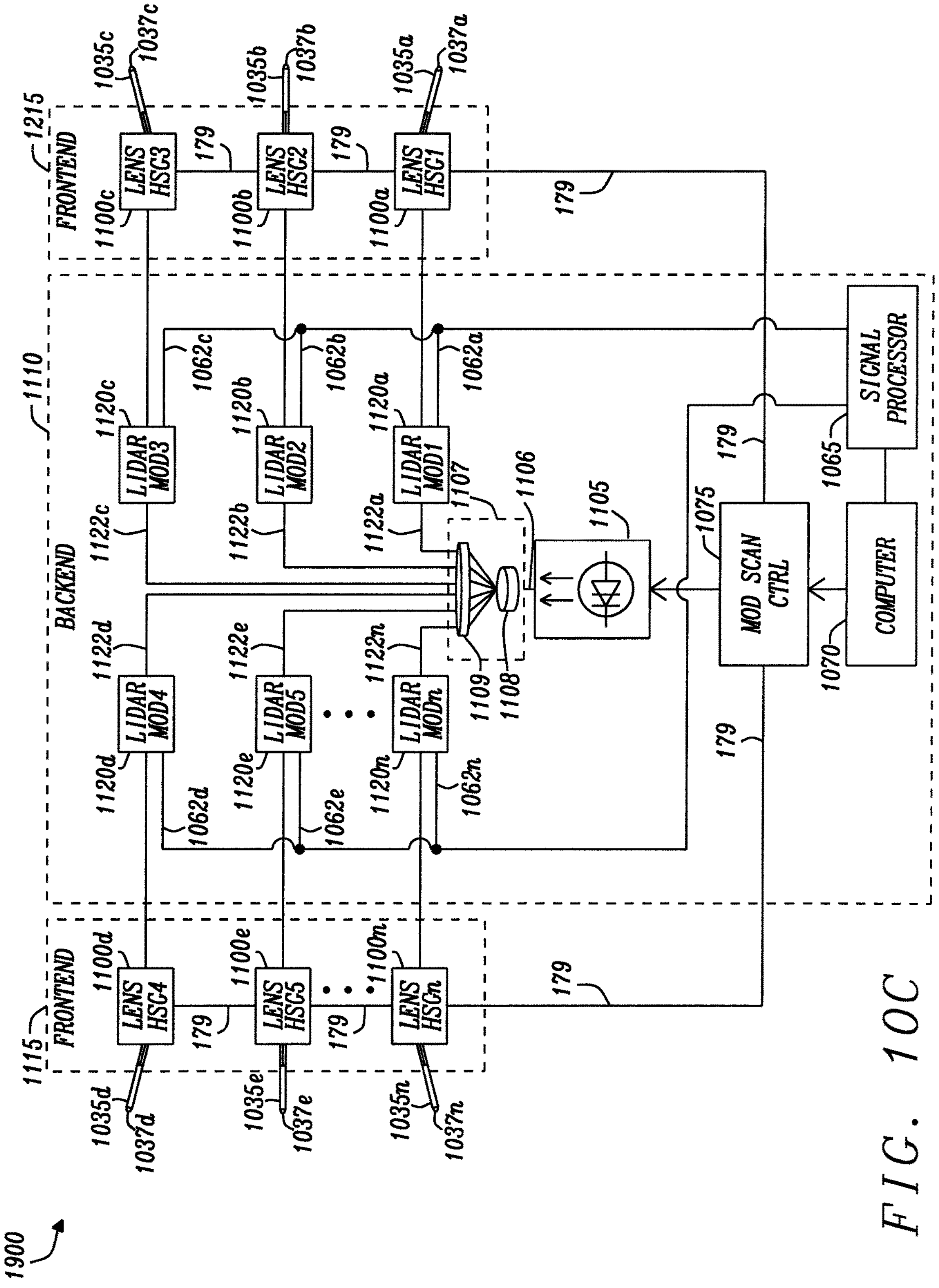
FIG. 10C is a schematic drawing of the Multiplexed LiDAR System with multiple lens housings, wherein each lens housing has the mechanism for controlling a single light element having a frontend lens or collimator element embodying the principles of the present disclosure.

FIG. 10C is a schematic drawing of the multiplexed LiDAR system 1900 with multiple lens housings 1100*a*, 1100*b*, 1100*c*, 100*d*, 1100*e*, . . . , 1100*n*, having the mechanism for controlling a two-dimensional movement of a single light element 1035*a*, 1035*b*, 1035*c*, 1035*d*, 1035*e*, . . . 1035*n* having a frontend lens or collimator element 1037*a*, 1037*b*, 1037*c*, 1037*d*, 10377*e*, . . . 1037*n* embodying the principles of the present disclosure.

A single backend system 1110 comprises one pulsed wavelength-modulated light source 1105 that transfers the pulsed wavelength-modulated light beam 1106 to a multiple beam splitter 1107. The exemplary multiple beam splitter 1107 includes a diffractive beam splitter 1108 that provides the number of separate beams required by the LIDAR system 1100. The multiple wavelength-modulated light beams are directed to a focusing lens 1109 for re-collimating each light beam 1122*a*, 1122*b*, 1122*c*, 1122*d*, 1122*e*, . . . , 1122*n*. Each light beam 1122*a*, 1122*b*, 1122*c*, 1122*d*, 1122*e*, . . . , 1122*n* is transferred to a TOI LIDAR module 1120*a*, 1120*b*, 1120*c*, 1120*d*, 1120*e*, . . . , 1120*n*. In various embodiments, a multi-channel optical switch can be used in place of the multiple beam splitter 1107 for applications that require high detection sensitivity, and a narrower field of view or slower detection speed is acceptable.

Each of the LiDAR modules 1120*a*, 1120*b*, 1120*c*, 1120*d*, 1120*e*, . . . , 1120*n* are connected to a lens housing 1100*a*, 1100*b*, 1100*c*, 100*d*, 1100*e*, . . . , 1100*n* with a single fiberoptic laser element 1035*a*, 1035*b*, 1035*c*, 1035*d*, 103*e*, . . . , 1035*n* within the front end of the Multiplexed LiDAR system 1110. Each lens housing 1100*a*, 1100*b*, 1100*c*, 100*d*, 1100*e*, . . . , 1100*n* is configured for 1-dimensional scanning as described in FIG. 10B. The lens housing 1100*a*, 1100*b*, 1100*c*, 100*d*, 1100*e*, . . . , 1100*n* has a fiberoptic laser element 1035*a*, 1035*b*, 1035*c*, 1035*d*, 103*e*, . . . , 1035*n* that transfers the sample pulsed wavelength-modulated coherent light beams 1122*a*, 1122*b*, 1122*c*, 1122*d*, 1122*e*, . . . , 1122*n* to scan one or more objects in different directions within the circumference of the surrounding environment.

The back-reflected wavelength-modulated coherent light beams 1122*a*, 1122*b*, 1122*c*, 1122*d*, 1122*e*, . . . , 1122*n* from the scanned object(s) are received by fiberoptic laser element 1035*a*, 1035*b*, 1035*c*, 1035*d*, 103*e*, . . . , 1035*n* and transferred to the LiDAR modules 1120*a*, 1120*b*, 1120*c*, 1120*d*, 1120*e*, . . . , 1120*n* to form an image based on the TOI measurement. The 1-dimensional scanning pattern may be linear or non-linear in time and may be unidirectional or bidirectional. In some implementations of the Multiplexed LIDAR system 1110, the 1-dimensional scanning pattern may be linear or non-linear in time. It may be in the form of a raster scan, spiral scan, or other patterns to collect the measurement information.

In various embodiments of FIG. 10C, each fiberoptic laser element 1035*a*, 1035*b*, 1035*c*, 1035*d*, 1035*e*, . . . , 1035*n* operates with a different line scanning pattern and line scanning speed for different types of objects or purposes. The line scanning patterns may be a 1-dimensional scan with a narrow scanning range (lower than 5 degrees) and high scanning speed (higher than 50 Hz), a 1-dimensional scan with a high scanning range (larger than 5 degrees) and low scanning speed (lower than 50 Hz), 2-dimensional scan with narrow scanning range (lower than 5 degrees in each dimension) and high scanning speed (higher than 20 Hz), 2-dimensional scan with high scanning range (higher than 5 degrees in each dimension) and low scanning speed (lower than 20 Hz), or a combination thereof.

The back-reflected wavelength-modulated coherent light beams 1122*a*, 1122*b*, 1122*c*, 1122*d*, 1122*e*, . . . , 1122*n* are received by the Interferometers of the LiDAR modules 1120*a*, 1120*b*, 1120*c*, 1120*d*, 1120*e*, . . . , 1120. The coherent light beams 1022*a*, 1022*b*, 1022*c*, 1022*d*, 1022*e*, . . . , 1022*n* are then processed by the balanced detectors 160 of the LiDAR modules 1120*a*, 1120*b*, 1120*c*, 1120*d*, 1120*e*, . . . , 1120. The back-reflected coherent light beams 1022*a*, 1022*b*, 1022*c*, 1022*d*, 1022*e*, . . . , and 1022*n* are converted to electrical signals that are transferred to the signal processor 1065. Each of the LiDAR modules 1120*a*, 1120*b*, 1120*c*, 1120*d*, 1120*e*, . . . , 1120*n* has a balanced detector 160 of FIG. 1B. The balance detectors 160 of FIG. 1B convert the light beams 1062*a*, 1082*b*, 1062*c*, 1062*d*, 1062*e*, . . . , 1062*n* that convert the coherent light beams 1022*a*, 1022*b*, 1022*c*,

1022*d*, 1022*e*, . . . , 1022*n* to electrical signals that are processed by the computer 970 to generate the image based on the TOI measurement.

The lens housing 1100*a*, 1100*b*, 1100*c*, 100*d*, 1100*e*, . . . , 1100*n* with a single fiberoptic laser element 1035*a*, 1035*b*, 1035*c*, 1035*d*, 1035*e*, . . . , 1035*n* are realized mechanically to provide the discrete horizontal and vertical scan motion of the single fiberoptic laser element 1035*a*, 1035*b*, 1035*c*, 1035*d*, 1035*e*, . . . , 1035*n* as shown in FIG. 10B in keeping with the principles of the present disclosure of providing the required discrete horizontal and vertical scanning motion to collect the measurement information. In various embodiments of FIG. 10C, the lens housing 1100*a*, 1100*b*, 1100*c*, 100*d*, 1100*e*, . . . , 1100*n* with a single fiberoptic laser element 1035*a*, 1035*b*, 1035*c*, 1035*d*, 1035*e*, . . . , 1035*n* do not provide any scan motion so the single fiberoptic laser element 1035*a*, 1035*b*, 1035*c*, 1035*d*, 1035*e*, . . . , 1035*n* remain stationary but aiming at different directions to collect the measurement information.

Figure 11A:
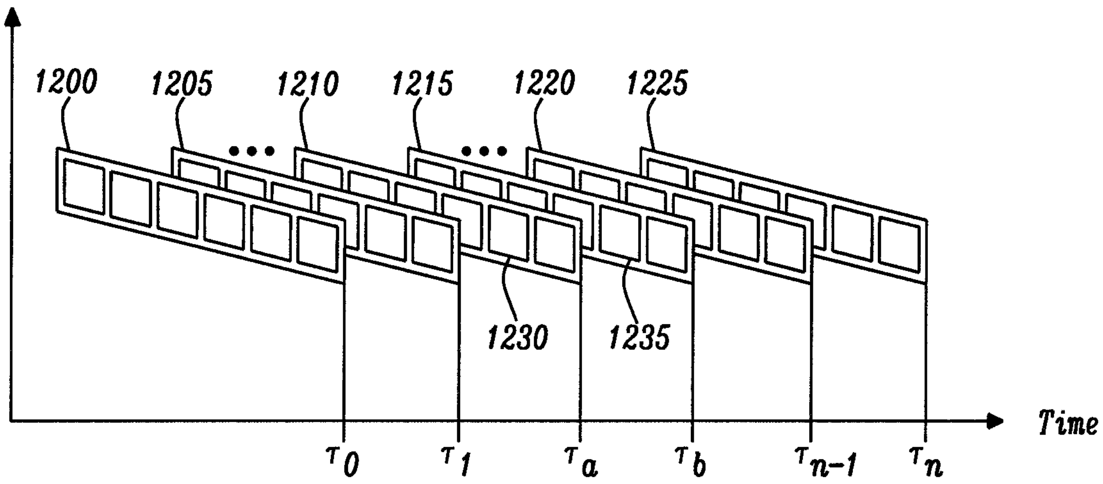
FIG. 11A illustrates the line-scan-based velocity measurement method of the TOI LIDAR system embodying the principles of the present disclosure.

FIG. 11A illustrates the line-scan-based velocity measurement method of the TOI LIDAR system embodying the principles of the present disclosure. The Multiplexed LiDAR System can be configured so that a small time delay is encoded in the second TOI modules, so the lines 1200, 1205, . . . , 1210, and 1215, 1220, . . . , 1225, are captured in an interleaved manner by the TOI modules 200*a* and 200*b* of FIG. 2, respectively, and represents a first and a second interference electrical signals 362*a* and 362*b* of FIG. 2.

The data 1230 and 1235 are transferred to the signal processor 365 and processed as described in FIG. 6A to thus determine the rising edges or falling edges of the data. Therefore, determining the data object's rising edges or falling edges provides the time difference between the data 1230 and 1235. The distance between the data 1230 and 1235 is then determined as the time difference ($t_b-t_a$) between the data 1230 and 1235. The time difference ($t_b-t_a$) between the data 2030 and 2035 is multiplied by the line scan rate of the optical interference signal and object's sampling applied to optical paths of the LiDAR modules 200*a* and 200*b* of FIG. 2 to determine the velocity of the object being measured.

Figure 11B:
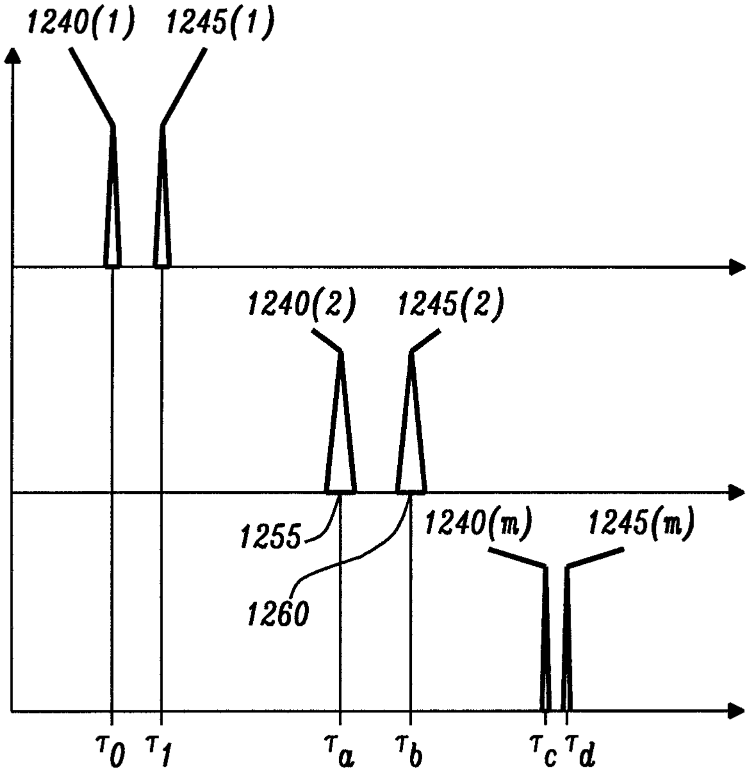
FIG. 11B illustrates the sample-based velocity measurement method of the TOI LIDAR system embodying the principles of the present disclosure.

FIG. 11B illustrates the sample-based velocity measurement method using the Multiplexed LiDAR system embodying the principles of the present disclosure. The Multiplexed LiDAR System can be configured so that a small time delay is encoded in the second TOI modules, so the samples 1240(1), 1240(2), . . . , 1240(*m*), and 1245(1), 1245(2), . . . , 1245(*m*), are captured in an interleaved manner by the TOI modules 200*a* and 200*b* of FIG. 2, respectively, and represents a first and a second interference electrical signals 362*a* and 362*b* of FIG. 2.

The data 1260 and 1265 are transferred to the signal processor 365 and processed as described in FIG. 6A to thus determine the rising edges or falling edges of the data. Therefore, determining the data object's rising edges or falling edges provides the time difference between the data 1260 and 1265. The distance between the data 1260 and 1265 is then determined as the time difference ($t_b-t_a$) between the data 1260 and 1265. The time difference ($t_b-t_a$) between the data 1230 and 1235 is multiplied by the sampling rate of the optical interference signal an object's sampling applied to optical paths of the LiDAR modules 200*a* and 200*b* to determine the velocity of the object being measured.

Figure 12:
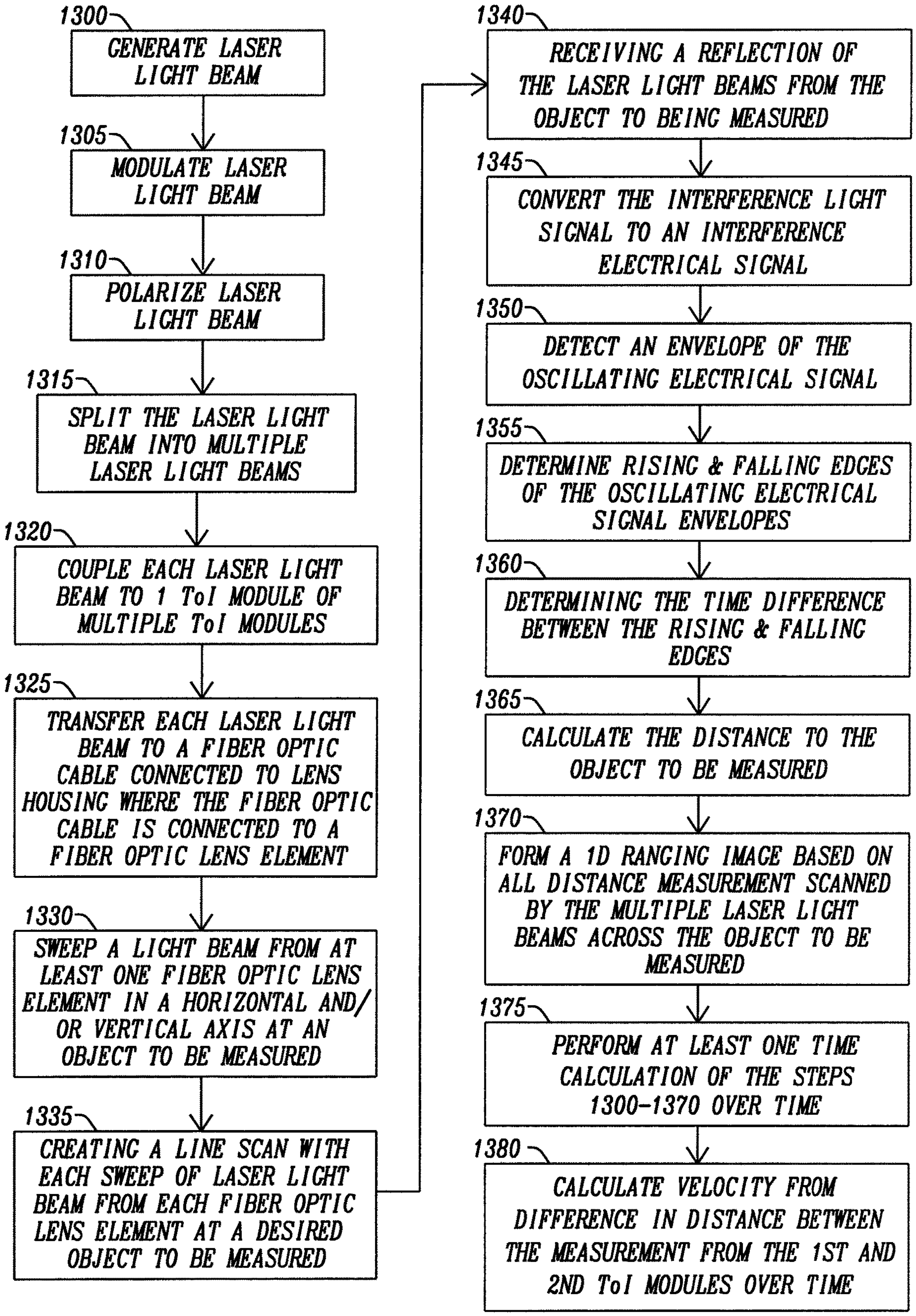
FIG. 12 is a flowchart of a method for line-scanned distance measurement for determining an object's velocity employing multiplexed distance measurement and determining an object's velocity employing the line-scanned distance measurements embodying the principles of the present disclosure.

FIG. 12 is a flowchart of a method for determining an object's distance employing a TOI based Multiplexed LiDAR system embodying the principles of the present disclosure. A laser light beam is generated (Box 1300). The laser light beam is modulated (Box 1305) with a wavelength-modulated or frequency-modulated signal to adjust the laser light beam wavelength or frequency. The laser light beam is then polarized (Box 1310) to adjust the laser light polarization states to maximize the amplitude of the optical interference signal or electrical interference signal.

The laser light beam is optically split (Box 1315) into multiple light beams, and each of the split laser light beams is coupled (Box 1320) to one ToI LiDAR module to create a sampling arm and a reference arm. Each laser light beam is transferred to a fiberoptic cable connected to a lens housing, where the fiber optic cable is connected to a fiberoptic lens element (Box 1325). The fiberoptic lens element is swept on a horizontal axis and/or a vertical axis aimed toward an object whose distance is to be measured (Box (1330). A scan line is created (Box 1335) with each sweep of the fiberoptic lens element.

The pulsed wavelength-modulated coherent laser beam is back-reflected (Box 1340) from the object to be measured and transferred to the optical circulator of the interferometer and then to an optical coupler to be combined with the reference pulsed wavelength-modulated coherent laser beam to form an optical interference signal. The optical interference signal is converted (Box 1345) to an oscillating electrical interference signal.

The electrical interference signals undergo an envelope detection process to identify (Box 1350) the envelopes of the electrical interference signal. The times of the rising or the falling edges of the envelope rising or falling edges of the envelope of the digitized electrical interference signal are determined (Box 1355). The time difference between the rising or falling edges of the envelopes of the electrical interference signals and a modulation/scan synchronization signal is determined (Box 1360), and the distance to the object to be measured is calculated (Box 1365).

A one-dimensional ranging image is formed (Box 1370) based on the distance measurement line scans formed by one or more of the multiple light beams across the object to be measured.

In FIG. 12 the method for determining an object's velocity employing a Time of Interference (TOI) based Multiplexed LiDAR system begins with performing (Box 1375) the steps of the method of FIG. 8A multiple times. The object's velocity is determined (Box 1380) as the difference in distance measured by the multiple TOI modules over time.

While this disclosure has been particularly shown and described with reference to the preferred embodiments thereof, it will be understood by those skilled in the art that various changes in form and details may be made without departing from the spirit and scope of the disclosure. Particularly, the Multiplexed Systems 100 of FIG. 2 and 800 of FIG. 9A may be implemented with Time of Flight (ToF), Amplitude Modulated Continuous Wave (AMCW), Frequency Modulated Continuous Wave (FMCW), or any combination of LiDAR devices known in the art.

What is claimed is:

1. A multiplexed line scanning apparatus within a multiplexed light detection and ranging (LiDAR) system for executing a line scan pattern for each sample pulsed wavelength-modulated coherent light beam of a plurality of sample pulsed wavelength-modulated coherent light beams, comprising:

pulsed wavelength-modulated narrow band light source for emitting a pulsed wavelength-modulated coherent light to be transmitted through a free-space path, an optical fiber, or an optical waveguide;

a LiDAR module comprising at least one interferometer and a balanced detector and connected to receive the pulsed wavelength-modulated coherent light from the pulsed wavelength-modulated narrow band light through the free-space path, an optical fiber, or an optical waveguide;

a lens housing connected to the LiDAR module to receive and transmit the pulsed wavelength-modulated narrow band light, comprising;

at least one fiberoptic lens element configured for receiving the pulsed wavelength-modulated narrow-band light from the LIDAR module and transferring the pulsed wavelength-modulated narrow-band light to an object to be measured, wherein the fiberoptic lens element comprises:

a lens or collimator, a cylindrical casing for providing structural support for the fiberoptic lens element, and the free-space path, the optical fiber, or the optical waveguide is housed in the cylindrical casing, and the lens or collimator is secured to the cylindrical casing, a two-axis pitch and yaw aiming device attached to the lens housing and attached to the fiber optic lens element to secure the fiberoptic lens element to the lens housing, comprising:

a pitch motion control device connected to the lens housing and providing a pitch control for the pointing of the fiberoptic lens element on a first axis, a yaw motion control device connected to the pitch motion control device and the lens housing for providing yaw control for pointing the fiberoptic lens on a second axis to direct the lens or collimator along a linear scan path for determining a distance or velocity of an object, a scan controller for providing the programming instructions to control the pitch motion control device and the yaw motion control device.

2. The multiplexed line scanning apparatus of claim 1 wherein the lens housing has an opening that allows the pulsed wavelength-modulated narrow band light to leave the lens housing and impact the object being measured and receive the back-reflected pulsed wavelength-modulated coherent light from the object.

3. A multiplexed line scanning light detection and ranging (LiDAR) system for executing a line scan pattern for each sample pulsed wavelength-modulated coherent light beam of a plurality of sample pulsed wavelength-modulated coherent light beams, comprising:

pulsed wavelength-modulated narrow band light source for emitting a pulsed wavelength-modulated coherent light to be transmitted through a free-space path, an optical fiber, or an optical waveguide;

a LiDAR module comprising an interferometer and a balanced detector and connected to receive the pulsed wavelength-modulated coherent light from the pulsed wavelength-modulated narrow band light through the free-space path, an optical fiber, or an optical waveguide;

a lens housing connected to the LiDAR module to receive and transmit the pulsed wavelength-modulated narrow band light, comprising;

a single fiberoptic lens element configured for receiving the pulsed wavelength-modulated narrow-band light from the LIDAR module and transferring the pulsed wavelength-modulated narrow-band light to an object to be measured, wherein the fiberoptic lens element comprises:

a lens or collimator, a cylindrical casing for providing structural support for the fiberoptic lens element, and the free-space path, the optical fiber, or the optical waveguide is housed in the cylindrical casing, and the lens or collimator is secured to the cylindrical casing, a two-axis pitch and yaw aiming device attached to the lens housing and attached to the fiber optic lens element to secure the fiberoptic lens element to the lens housing, comprising:

a pitch motion control device connected to the lens housing and providing a pitch control for the pointing of the fiberoptic lens element on a first axis, a yaw motion control device connected to the pitch motion control device and the lens housing for providing yaw control for pointing the fiberoptic lens on a second axis to direct the lens or collimator along a linear scan path form determining a distance or velocity of an object, a scan controller for providing the programming instructions to control the pitch motion control device and the yaw motion control device.

4. The multiplexed line scanning light detection and ranging (LiDAR) system of claim 3 wherein the lens housing has an opening that allows the pulsed wavelength-modulated narrow band light to leave the lens housing and impact the object being measured and receive the back-reflected pulsed wavelength-modulated coherent light from the object.

5. A multiplexed line scanning light detection and ranging (LiDAR) system for measuring a distance from the multiplexed LiDAR system to features on an object, comprising:

a coherent light source;

a modulating controller in communication with the coherent light source and configured for generating and controlling a control signal that is transferred to the coherent light source for modulating the coherent light source to generate a pulsed wavelength-modulated coherent light beam for creating a scan pattern for measuring a surface of the object;

a LiDAR module connected with the coherent light source for receiving the pulsed wavelength-modulated coherent light beam and comprising: an interferometer for generating a sampling pulsed wavelength-modulated coherent light beam and a reference pulsed wavelength-modulated coherent light beam, and a balanced detector;

one or more multiplexed line scanning apparatus for receiving the pulsed wavelength-modulated coherent light beam and transferring the pulsed wavelength-modulated coherent light beam to a fiberoptic lens element, wherein the fiberoptic lens element is actuated with a line scan pattern such that the sample pulsed wavelength-modulated coherent light beam scans a desired light pattern, said one or more multiplexed line scanning apparatus comprising:

a lens housing connected to the LiDAR module to receive and transmit the pulsed wavelength-modulated narrow band light comprising:

a single fiberoptic lens element configured for receiving the pulsed wavelength-modulated narrow-band light from the LIDAR module and transferring the pulsed wavelength-modulated narrow-band light to an object to be measured, wherein the fiberoptic lens element comprises:

a lens or collimator, and a cylindrical casing for providing structural support for the fiberoptic lens element, and the free-space path, the optical fiber, or the optical waveguide is housed in the cylindrical casing, and the lens or collimator is secured to the cylindrical casing, and a two-axis pitch and yaw aiming device attached to the lens housing and attached to the fiber optic lens element to secure the fiberoptic lens element to the lens housing comprising:

a pitch motion control device connected to the lens housing and providing a pitch control for the pointing of the fiberoptic lens element on a first axis, a yaw motion control device connected to the pitch motion control device and the lens housing for providing yaw control for pointing the fiberoptic lens on a second axis to direct the lens or collimator along a linear scan path form determining a distance or velocity of an object, and a scan controller for providing the programming instructions to control the pitch motion control device and the yaw motion control device;

a modulation scan controller configured for modulating the coherent light source to generate the pulsed wavelength-modulated coherent light beam and configured for implementing the scan pattern for the fiberoptic lens element;

a signal processor that receives an electrical signal generated by the back reflected pulsed wavelength-modulated coherent light beam at the balanced detector; and convert the electrical signals to digitized electrical signals; and a computer system configured programmed to calculate the time delay determined by the digitized electrical signal from the signal processor and generates a displayed imaging range based on the distance from the target.

6. The multiplexed line scanning LiDAR system of claim 5 wherein at least two LiDAR modules are connected with the coherent light source via an optical splitter or an optical switch for receiving the pulsed wavelength-modulated coherent light beam.

7. The multiplexed line scanning LiDAR system of claim 5 wherein the one or more pulsed wavelength-modulated coherent light beams are back-reflected to the lens housing to the lens or collimator of the fiberoptic lens element to the interferometer and then to the balanced detector within a LiDAR module for determining dimensions of the scanned object.

8. The multiplexed line scanning LiDAR system of claim 5 wherein the lens housing has an opening to allow the fiberoptic element to scan on a first and a second axis to allow the line scan to have a desired orientation.

9. The multiplexed line scanning LiDAR system of claim 5 wherein the coherent light source is modulated by controlling the coherent light source driving current, adjusting the temperature of the narrow bandwidth light source, or adjusting the phase of the light emitted from the light source.

10. The multiplexed line scanning LiDAR system of claim 5 wherein the signal processor is configured to determine envelopes of at least two digitized electrical signals.

11. The multiplexed line scanning LiDAR system of claim 5 wherein the signal processor is configured to measure delays of the at least two digitized electrical signals at falling edges of the envelopes of the digitized electrical signal.

12. The multiplexed line scanning LiDAR system of claim 5 wherein the scan controller is configured to create the scan pattern that generates a scan synchronization signal and is configured to apply the scan synchronization signal to the fiberoptic lens element to generate the line scan patterns that achieve the collection of the measurement information determining the distance and velocity of the object.

13. The multiplexed line scanning LiDAR system of claim 5 wherein the multiplexed LiDAR system is implemented as fiberoptics, bulk optics, integrated photonic circuitry, or any combination of optical photonic devices.

14. A method for determining an object's distance comprises the steps of:

generating a coherent light beam;

modulating the coherent light beam with a pulsed wavelength-modulating signal;

polarizing the pulsed wavelength-modulated light beam by adjusting the polarization states of the pulsed wavelength-modulated light beam and maximizing the amplitude of optical interference signals;

optically splitting the pulsed wavelength-modulated light beam into at least two pulsed wavelength-modulated light beams;

coupling each of the at least two pulsed wavelength-modulated light beams to one of at least two LiDAR Modules for creating a sampling pulsed wavelength-modulated light beam and a reference pulsed wavelength-modulated light beam;

transferring the one pulsed wavelength-modulated light beams to one multiplexed line scanning apparatus for establishing a line scan pattern of the pulsed wavelength-modulated light beam;

scanning the at least one pulsed wavelength-modulated light beam at an object whose distance from a source of the wavelength-modulated coherent light beam is to be measured;

receiving the back-reflected portion of the at least one pulsed wavelength-modulated light beams from the object to be measured;

coupling each back-reflected portion of the at least one pulsed wavelength-modulated light beam to the LiDAR module of the at least one pulsed wavelength-modulated light beam to form an electrical signal representing each of the at least two pulsed wavelength-modulated light beams;

digitizing the electrical signals;

detecting an envelope of each of the digitized electrical signals;

determining the times of rising or falling edges of the envelope of the digitized electrical signal;

determining the time difference between the rising or falling edges of the envelope of the digitized interference signal; and calculating a distance to the object to be measured is calculated.

15. The method of claim 14 further comprises the steps of:

determining the object's velocity by calculating the distances from the at least one LiDAR module separately; and calculating the object's velocity as the change in distance over time.

16. The method of claim 15 further comprises the step of implementing the method with fiberoptics, bulk optics, integrated photonic circuitry, or any combination of optical photonic devices.

* * * * *